(12) United States Patent
Pineau et al.

(10) Patent No.: US 8,907,763 B2
(45) Date of Patent: Dec. 9, 2014

(54) SYSTEM, STATION AND METHOD FOR MUSTERING

(75) Inventors: Steven Pineau, Richmond (CA); Ola Wiberg, Cloverdale (CA); David Lee, Vancouver (CA); Shayne Peter Bates, Fairfax, VA (US); Steven Chand, Surrey (CA); Dennis Raefield, Danville, CA (US)

(73) Assignee: Viscount Security Systems Inc., Burnaby (CA)

(*) Notice: Subject to any disclaimer, the term of this patent is extended or adjusted under 35 U.S.C. 154(b) by 0 days.

(21) Appl. No.: 13/607,657

(22) Filed: Sep. 7, 2012

(65) Prior Publication Data

US 2013/0214901 A1 Aug. 22, 2013

Related U.S. Application Data

(63) Continuation-in-part of application No. 13/215,211, filed on Aug. 22, 2011, which is a continuation-in-part of application No. 12/958,780, filed on Dec. 2, 2010.

(51) Int. Cl.

| | | |
|---|---|---|
| G05B 19/00 | (2006.01) | |
| G05B 1/01 | (2006.01) | |
| G07C 9/00 | (2006.01) | |
| H04L 29/06 | (2006.01) | |
| G06F 21/32 | (2013.01) | |
| G06F 21/34 | (2013.01) | |
| H04W 4/00 | (2009.01) | |
| H04W 4/22 | (2009.01) | |
| H04W 12/06 | (2009.01) | |
| G08B 25/14 | (2006.01) | |

(52) U.S. Cl.
CPC .............. *G05B 1/01* (2013.01); *G07C 9/00166* (2013.01); *H04L 63/083* (2013.01); *H04L 63/101* (2013.01); *G06F 21/32* (2013.01); *G06F 21/34* (2013.01); *H04W 4/008* (2013.01); *H04W 4/22* (2013.01); *H04W 12/06* (2013.01); *G08B 25/14* (2013.01); *G07C 9/00571* (2013.01); *G07C 2009/00793* (2013.01)
USPC ......... 340/5.61; 340/5.65; 340/5.7; 340/5.81; 709/223; 709/225

(58) Field of Classification Search
USPC ................................ 340/5.61, 5.2; 455/404.2
See application file for complete search history.

(56) References Cited

U.S. PATENT DOCUMENTS

| | | | | |
|---|---|---|---|---|
| 8,009,013 | B1 * | 8/2011 | Hirschfeld et al. ............ 340/5.2 |
| 2004/0003073 | A1 * | 1/2004 | Krzyzanowski et al. ..... 709/223 |

(Continued)

OTHER PUBLICATIONS

Kantech KT-NCC Network Communication Controller Installation Manual, DN1611-0811, 2008.

*Primary Examiner* — Daniel Wu
*Assistant Examiner* — Frederick Ott
(74) *Attorney, Agent, or Firm* — John R. Flanagan

(57) ABSTRACT

Mustering of persons from a building in an emergency situation is made possible by tagging mustering stations with unpowered, unique tokens which can be read by a user's personal mobile electronic device. The user's device transmits both mustering station identity and user identification to a remote server, where, upon successful validation, the user is removed from a list of persons to be mustered. The system may be part of a physical access security system for the building, in which single-use digital tokens as well as traditional cards may be used to open the doors. The permissions relating to doors or other physical assets may also be used to grant access to logical assets within the building.

18 Claims, 17 Drawing Sheets

(56) References Cited

U.S. PATENT DOCUMENTS

| | | | |
|---|---|---|---|
| 2006/0235697 A1* | 10/2006 | Filibeck | 704/273 |
| 2008/0030359 A1* | 2/2008 | Smith et al. | 340/686.1 |
| 2008/0209534 A1* | 8/2008 | Keronen et al. | 726/9 |
| 2009/0189736 A1* | 7/2009 | Hayashi | 340/5.81 |
| 2011/0313893 A1 | 12/2011 | Weik, III et al. | |

* cited by examiner

SYSTEM, STATION AND METHOD FOR MUSTERING

This application is a continuation-in-part of and claims the benefit of U.S. patent application Ser. No. 13/215,211, filed Aug. 22, 2011, which is a continuation-in-part of and claims the benefit of U.S. patent application Ser. No. 12/958,780, filed Dec. 2, 2010, priority from the filing date of which is claimed. The disclosure of said applications are hereby incorporated herein by reference thereto.

TECHNICAL FIELD

The present invention generally relates to the field of mustering in the case of emergency and, more particularly, is concerned with a system, station, method and database for confirming that persons have exited a building by using mustering station tokens and personal mobile devices to read the tokens.

BACKGROUND

In many businesses, organizations or public areas, security systems are employed to control access to the physical facilities or resources, and to safeguard authorized and unauthorized visitors. Security risks may be managed by controlling access by specified individuals based upon a specific set of criteria, such as time of day or day of the week.

In a typical physical-access controlled environment, a physical security system may include one or more physical devices, such as: entry lock mechanisms; entry open/close sensors; video surveillance cameras; microphones; credentials, such as some form of electronic or physical identification of a device or individual; credential identification input devices, such as a badge reader, PIN number keypad or biometric detector; communication and connectivity devices, such as door control panels; credential verification devices; policy-based access control devices, such as access control panels; credential and policy creation servers; a monitoring, event logging, and alarm reporting server; and a permission database defining which users have access to which facility, and when.

The control panel is typically located in close proximity to an entrance. Many control panels used in a typical physical-access controlled environment have a full or partial credential list. As facilities have multiple entrance points, each often with a corresponding control panel, it requires considerable work to ensure that all control panels are up to date. There are some access control systems that offer centralization of the data that would otherwise be distributed in multiple control panels. In these systems, the control panels pass credential information on to a central device such as a server for credential verification and policy enforcement. The server, if granting access, will then send an 'access granted' signal to the appropriate control panel, which would then forward a signal to a relay for controlling the opening of a door.

It is common for access control devices, such as badge or card readers, electro-mechanical locks, and door sensors, to be connected by a serial Wiegand or RS-485 connection to a door control panel. The functional devices typically communicate via a simple signaling protocol, which in many cases is specific to a single vendor.

Many other security devices and other physical devices and systems also need passwords, key codes, biometric data or other inputs to allow a user to control or access such a device or system. Such devices and systems also often have a local control panel or proprietary control software that is run on a local computer or web server. Some devices may be IP devices that connect to an Ethernet or the Internet, and others that communicate using the RS-485 protocol may be connected to the Internet via a gateway or bridge which converts the data between the RS-485 and TCP/IP formats. Each device or system has its own hardware or software control interface. As a result of the disparate control means and separate methods for granting permissions, it is often inconvenient for a user or administrator to access, program and control each security device or system efficiently. Furthermore, self-contained, on-site security systems or devices can be compromised or malfunction without being able to issue notification to an interested party. Also, it is onerous for an administrator or building manager to set and change the permissions.

Referring to the prior art shown in FIG. 1, physical devices 1, 2 may be locally connected to, and managed by, a control panel 4 or dedicated computer 6. Permissions P1 and P2 for the users allowed access to each device are stored in local databases 5, 7 within, or connected to, the control panel 4 or dedicated computer 6. The control panel 4 and/or the dedicated computer 6 may be connected to an Ethernet or the Internet 8, allowing users to optionally access the databases and devices via a personal or other computer terminal 9.

The current convergence of technologies may mean that multiple different devices and systems may be connected to, and operated from, the same computer 9 or network 8. A user of such a computer, however, faces the problem that each device or system needs to be accessed separately, each with its own software interface, name/password combination and method for managing permissions. Furthermore, existing physical security systems are considered to be much less secure than IT security systems.

In the field of computer networks, systems exist for managing access to network resources such as computers, printers, files, etc. Such a system may be, for example, an Active Directory as provided by Microsoft. An Active Directory is a central location for network administration. It provides access to objects representing all network users, computing devices, and resources and the ability to group objects together to facilitate management and permission setting. For example, a single sign-on allows users access to many network resources. A user's name and password combination may form a user identity, which is valid throughout the network, which might span a building, a city, or several sites across the world.

Mustering poses a problem in an emergency as it is often a manual task to determine which persons have exited a building and which remain inside. In cases where persons have been asked to scan a key fob or card on their way out of a building, some people may ignore this in order not to delay egress. In other cases, a bottleneck may result potentially causing injuries and additional risk to the people still inside. A further problem is that, in an emergency, power to operate the electronic devices in the building may be cut.

SUMMARY OF INVENTION

The present invention is directed to a remote, computer-based system, method and database that provides a common interface for accessing, controlling and managing multiple different types of physical devices via the Internet. Passwords and permissions for the physical devices are stored remotely, in a common location, and all decisions as to whether a user may control a particular device are made in the remote location. Anything which is a physical IP device and has associated password security may be connected to the system, which may also manage traditional logical assets, thereby merging the physical and logical password security management functions into a unified permissions management system.

Users of the system may be defined as members of groups, and groups may be assigned access to the areas and/or the physical devices within the areas of a facility. By assigning a user to a group, that user is automatically granted access to the area or devices for which the group has permission. A user may be a member of more than one group. Likewise, access may be granted in a similar way to logical assets, using the same or different groups.

The present invention may be used for interfacing facility access with control, particularly for facilities or physical premises, such as buildings, homes, physical infrastructure and restricted areas within buildings. It may make use of a device such as an electronic bridge (hereinafter for sake of brevity referred to as a "bridge") to interface physical devices such as door entry control relays with a network that uses the internet protocol, without the need for a control panel. The physical devices may be legacy security devices or they may be current or future devices. The physical devices need not all follow the same protocol, or the same version of a protocol, as the flexibility to accept different protocols is built into the bridge. As a result, building managers are not tied to a single vendor for supplying access security devices. Instead of requiring field upgrades and replacement of panel-compatible hardware, as is done now, once the bridge is installed and wired, there are no changes to be made in the installed plant. All database and card access information is contained in a network-based control unit, such as a control and monitoring computer (CMC), so that future requirements are easily accommodated. Transparency of the bridge provides for future applications, and changes, to be made in the CMC thereby not requiring any upgrades to, or replacement of, the hardware of the bridge, wherever it may be installed.

In particular, the present invention may be used to provide electronic records of persons who have mustered outside a building without use of a traditional card reader. In this configuration, a mustering station is tagged with a unique identifying token, such as a quick response (QR) code, near field communication (NFC) chip or other radio frequency identification (RFID) tag. A user's personal mobile device, such as a smart phone, is used to detect the tag and/or read the token, and transmit both an identifier of the tag and the user's identification to a remote server, where the record of persons having mustered is updated.

Disclosed is a mustering station comprising: a structure located apart from a building from which persons are to be mustered in case of emergency; and an unpowered token attached to the structure, the token comprising an identifier of the mustering station, wherein the identifier is detectable by a personal mobile device and is able to be transmitted by the personal mobile device to a remote server.

Also disclosed is a mustering system comprising: a mustering station; an unpowered token comprising an identifier for, and attached to, the mustering station; and a server remote from the mustering station and configured to store a list of persons to be mustered; wherein the server is configured to: receive, from a personal mobile electronic device located in the vicinity of the mustering station, the identifier and an identification of the personal mobile electronic device; check whether the identification is valid; and if the identification is valid, remove a user of the personal mobile device from the list.

Further disclosed is a method for mustering, comprising: compiling, at a server, a list of persons to be mustered; receiving, by the server, from a personal mobile electronic device located in the vicinity of a mustering station, an identifier of the mustering station and an identification of the personal mobile electronic device, the identifier having been retrieved from a token attached to the mustering station; checking, by the server, whether the identification is valid; and if the identification is valid, removing a user of the personal mobile device from said list.

Still further disclosed are one or more non-transitory computer readable media comprising computer readable instructions that, when executed by one or more processors cause a server to: receive, from a personal mobile electronic device located in the vicinity of a mustering station, an identifier of the mustering station and an identification of the personal mobile electronic device; check whether the identification is valid; and if the identification is valid, remove a user of the personal mobile device from a list of persons to be mustered.

BRIEF DESCRIPTION OF DRAWINGS

The drawings illustrate embodiments of the invention, but should not be construed as restricting the scope of the invention in any way.

DETAILED DESCRIPTION

Figure 1:
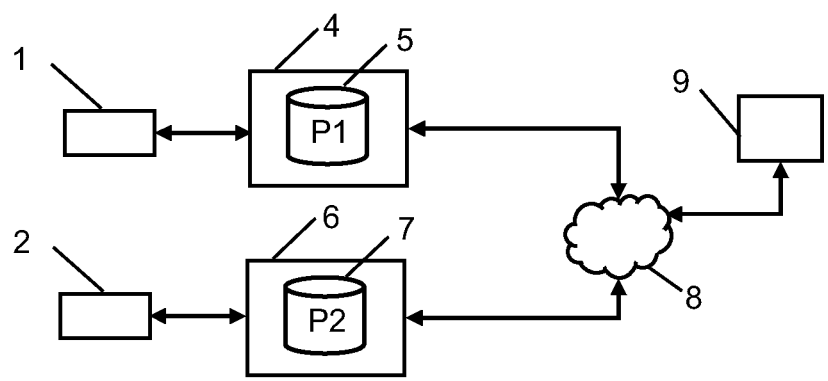
FIG. 1 is a schematic diagram of the prior art.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware and software is not always sharp, it being understood by those skilled in the art that software implemented processes may be embodied in hardware, firmware, or software, in the form of coded instructions such as in microcode and/or in stored programming instructions.

Physical Devices

There are many physical devices and systems that may be managed and controlled by the present invention. For example, intrusion devices may be connected such as alarm keypads. Such an alarm keypad may operate over an RS-485 connection that is converted to a TCP/IP protocol for transmission over the Internet, or it may be an IP alarm keypad. Other devices may include burglar alarms, fire alarms, IP fire alarms, card readers, RFID entry devices, biometric entry devices, intercoms, IP voice devices and CCTV cameras. Combination devices may also be managed, such as an IP camera-intercom system or an IP camera-microphone-keypad-reader system.

Non-security devices may also be managed by the system, and may include, for example, HVAC and other building management components and devices, such as lights, daylight sensors, light level sensors, temperature sensors, heating appliances, air conditioning systems, humidity detectors, automated blind controls, occupancy sensors and smoke sensors. Also included may be IP Programmable Logic Controllers, nurse call devices, any kind of SCADA device and batch systems, etc. While these are not security devices, they may well require passwords and permissions to be granted in order for users to use them. In fact, any kind of managed device that has an IP address or may be allocated an IP address may be incorporated in the system.

Devices such as cars, forklift trucks, buses, cranes, diggers, workshop machinery, laboratory equipment, furnaces, production lines, public announcement systems, showers, microwaves, electric bikes, and any other vehicle, machine or piece of equipment are further examples of physical devices that may be provided with an IP address and linked to the system such that access to them is granted by a user's logging on to a central permissions directory with a single password. Such physically detached devices may be connected to the system using known wireless connection and communication methods.

Physical devices may also be referred to as functional devices herein.

Areas

Physical devices may be grouped into areas, or zones, which may require different levels of control. Examples of controlled areas are the reception area of a building, the office area, the storeroom, etc.

Groups

Users may be grouped together in groups such as employees, managers, security personnel, etc. Some of these groups may be aligned with job function or department, but equally they may be independent. Whereas a user is generally in only one department, a user may be a member of more than one group.

Logical Assets

These assets generally include computing devices such as desktop computers, servers, laptops, electronic or optical storage devices, printers and electronic assets such as files and other electronic data. Logical assets include devices that are usually found in a computer network, such as a LAN or a WAN.

Mass Notification Systems

Mass notification systems, such as systems for bulk emailing, bulk texting, sending tweets, sending other short messages with a limited character count or posting on social networks; or public address loudspeaker systems, etc. may also be included as devices in the overall system. Permissions to access mass notification systems, and thereby send out messages to a multitude of people at once, may be included in the permissions database. Such a system may be useful for informing users of emergency situations, and well as for general provision of information. A mass notification system may be a logical or physical device or system.

Control and Monitoring Computer (CMC)

The CMC provides a unified platform through which the physical devices may be controlled. It also includes or has access to a database of all the users, IDs of users and/or users' personal mobile electronic devices, passwords, permission levels, policies, etc for all the physical devices connected to the system. The database may be embodied in an Active Directory by Microsoft, for example. The database contains all the details which permit the CMC to determine whether or not to allow access to a particular user to manage or control a physical device. The use of such a central database eliminates the need to store a different set of user IDs and permissions in each individual device or system. In a security system for a building, for example, the CMC may permit employee access management, visitor management and Facility Friend™ Management as provided by Viscount Systems Inc. (the assignee of the present invention). Rules, permissions and policies for multiple physical devices may be assigned in groups, at the same time, resulting in efficient management within the unified physical and logical schema of the overall system. The database may be located within the CMC server or remote from it.

IP-Based Messaging Between Devices

If an alarm is triggered by one device connected to the CMC, then it is possible for the CMC to send messages to other devices connected to the network. For example, a fire alarm that is triggered may cause the CMC to send messages to door lock devices instructing them to unlock.

Cameras that are connected to the system may include software for interpreting the images detected by the camera. For example, if image analysis suggests that there is an intruder, other cameras may be instructed to pan/tilt towards the suspected intruder, and additional lighting connected to the network may be switched on. A signal sent to the CMC may result in the CMC's sending of an alert to a security guard monitoring the cameras or premises.

In some configurations, devices may be enabled to send messages directly to each other.

Encryption

Some physical devices may encrypt data before transmitting it. For example, door entry readers, in addition to transmitting Wiegand data pulses, may also have the capability to send encrypted data on separate RS-485 (or equivalent) data lines. In the latter case, a bridge would take the encrypted data stream then put that data stream into its TCP encrypted packets. At the receiving end, in the CMC, the TCP packet would be decrypted with the bridge keys to reveal the reader-encrypted data, which would in turn be decrypted with the reader key stored in the CMC, database or active directory. Such readers or other devices that perform encryption may transmit only on RS-485 data lines, on RS-458 and other lines, or on other lines only. It may also possible for readers to scramble or encrypt the streams of Wiegand pulses using one or more encryption algorithms. Whether the signal to be transferred to the CMC is encrypted or not is irrelevant to the bridge, as it transmits whatever data it receives transparently. In an alternate configuration, the bridge may be configured to convert the encrypted RS-485 signal to TCP/IP, without having a separate channel for converting Wiegand pulses. Other transmission formats besides RS-485 may also be converted.

Door Token

A door token, which may be referred to simply as a token, is a unique, passive identifier for a door or any other kind of portal, such as a barrier, physical access point or exit point. Being passive, it does not need to be powered, and does not need any electrical connection to it. It may be placed on a door, adjacent to it or in its vicinity. A door token can take on any form, so long as it is passive and can uniquely identify the door to which it is associated. Examples of such door tokens are QR codes and NFC chips. Ideally, they should be securely attached to or embedded in the door or surrounding part of the building, such that their removal is difficult without damage. If the door token is embedded, and it is not evident as to where it is, there should be an external marker to show users where it is. Other forms of identification and/or other types of technology may be used to identify a door. For example, traditional bar codes may be used.

Digital Token

A digital token is a soft, electronic or virtual token that does not have any macroscopic physical form and typically exists in general purpose electronic storage media that is also used for storing other data. Such storage media may be electronic memory found in a server or a personal mobile communication device, for example. Digital tokens can be transmitted between a server and a user's personal electronic device via a network such as the Internet, a telecommunication network, or both.

Mustering Token

A mustering token is a unique, passive identifier for a mustering station, such as a post located in a parking lot outside a building from which occupants are required to muster in the case of emergency in the building. Being passive, it does not need to be powered, and does not need any electrical connection to it. It may be placed on any structure away from a building, or even on an outbuilding. A mustering token can take on any form, so long as it is passive and can identify the mustering station to which it is associated. Examples of such mustering tokens are QR codes and NFC chips. Ideally, they should be securely attached to or embedded in the structure, such that their removal is difficult without damage. If the mustering token is embedded, and it is not evident as to where it is, there should be an external marker on the mustering station to show users where it is. Other forms of identification and/or other types of technology may be used to identify a mustering station. For example, traditional bar codes may be used.

Personal Mobile Device

A personal mobile device may be a smart phone, a tablet computer, an iPod™ mobile digital device or any other electronic communication device carried or worn on the person that can additionally be used for detecting a door token, reading a door token, or both. For example, the personal mobile device may incorporate a camera that can capture an image of a QR code. As another example, the personal mobile device may incorporate an NFC module that can detect and read NFC tags that are in close proximity to the electronic device. Other technologies may be incorporated in the personal mobile devices that detect and/or read door tokens using other technologies. The main requirements of the personal mobile device is that it can detect door tokens and communicate with a remote server. Optionally, the mobile device may be configured to capture biometric or other data and transmit this to the server as well, permitting the system to make use of multi-factor authentication.

Unified Permissions System Overview

Figure 2:
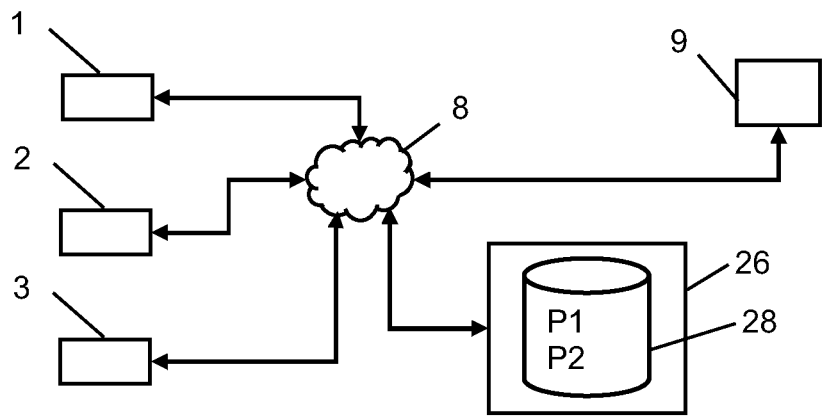
FIG. 2 is a schematic diagram of an overview of the unified permissions system.

Referring to FIG. 2, a schematic diagram of the permissions system is shown. Physical devices 1, 2 connect to an Ethernet or the Internet 8 without an intervening control panel or dedicated computer. Note that the connection may be made via an intervening bridge or gateway. Permissions P1 and P2 for users of the physical devices are stored in a CMC 26 or other computer comprising a permissions database or directory 28. The permissions database 28 is unified, in that it may also be used for storing permissions for users to access logical assets and resources 3. Permissions P1 and P2 may represent individual permissions or group permissions. A permission may be limited by the day or days of the week, the time of the day or by some other rule. The database 28 may be accessed by use of computer 9 via the Ethernet or the Internet 8.

Example of a Bridge

A bridge acts transparently to convey remote information, such as digital inputs or Wiegand reader inputs, to a CMC. One such CMC may be a MESH™ Server provided by Viscount Systems Inc. The CMC controls all decisions regarding what is to be done with the conveyed digital inputs or Wiegand card inputs, and when such decisions are made, the CMC conveys the commands back to the bridge, via the Internet, for execution by functional devices, namely, output devices such as operating annunciators and access devices, such as door strikes. The term "functional devices" is meant in a generic sense to cover all devices serving or performing single or multiple functionalities (functions or actions), including but not limited to security functions.

Significantly, the bridge does not make any decisions about the data it is obtaining from its input sources. The bridge simply passes on the data to a CMC, which makes all the decisions then sends commands back to the bridge, telling the bridge what functional devices need to be activated. By such transparency and bridging operation, the bridge is not restricted from future expansion in terms of longer data streams and faster device protocols.

The Internet facilitates the conveyance of information to and from the bridge. The information conveyed, in both directions, is packaged in a format suitable for transfer via the Internet Protocol (IP) foundation using the Transmission Control Protocol (TCP) known as the TCP/IP protocol suite. The TCP/IP protocol suite has been chosen for the conveyance of the packaged data, in both directions, because of its reliability to deliver data packets to the intended destination. Furthermore, as an example, the TELNET protocol, which runs on top of IP, provides for terminal-like operation so that the CMC may be configured to communicate with serial RS-485 devices connected to the bridge. The use of the TELNET protocol is optional, as is the use of any other protocol which may run on top of IP.

Bridges with different numbers of channels may form an Internet-ready product family. For example, the bridge may be a single-channel unit, a dual-channel unit, a quad-channel unit, etc., each of which provides the appropriate hardware to connect various functional devices, such as digital contact inputs and Wiegand-compliant card readers at one end, via the Internet, to a customer's control and monitor computer (CMC) at the other end. In essence, the bridge may make a connection between dissimilar technologies such as the Internet at the one end and discrete functional devices at the other end. The bridge is not limited to only Wiegand-compliant card readers, as it may be adapted as required to any input or output source.

Figure 3:
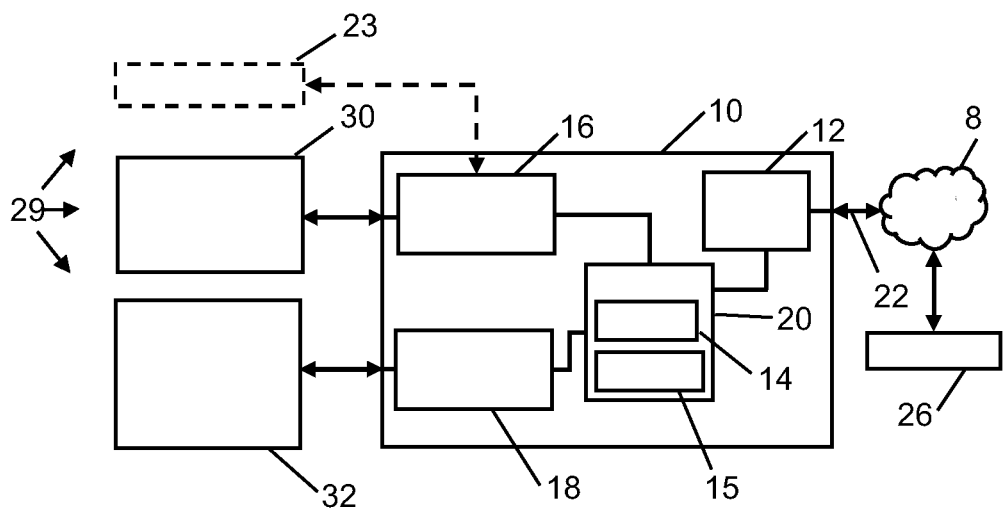
FIG. 3 is a block diagram of an exemplary embodiment of a bridge for interfacing various functional devices for facility access with a network for control.

Referring to FIG. 3, there is illustrated an exemplary embodiment of a bridge 10 that is typically deployed at a location such as near an entrance to a building. The bridge 10 is connected by a communications link for example an Ethernet 22, via a network for example the Internet 8, to a CMC 26 which may be a server, for example. Depending on the type of network 8, the bridge 10 may be located in the same building as the CMC 26, but remote from it, or it may be in a different building.

For connection to the network 8, the bridge 10 has Media Access Controller (MAC) and Physical Timing Generator (PHY) circuits 12. The MAC is an electronic integrated circuit with circuits to implement an interface between one or more programs running in the central processing unit (CPU) 20, and the buffering of data packets required for Internet operation. The PHY is an electronic integrated circuit with circuits to create the high-speed serial bit-timing for putting the packet data onto the Ethernet 22 for transport via the Internet 8. The PHY contains the circuits to connect to the Ethernet 22, so the PHY is the doorway for input and output. The CPU 20 may have internal memory (MEM) 14 for storing the programs and other information during operation. In the past, the CPU 20 and memory 14 would be separate integrated circuits, but today, they are typically combined into one larger CPU integrated circuit. Memory 14 may be of different types, such as volatile and non-volatile, and it may be distributed partially within the CPU 20 and partially external to it. Typically, a CPU, MAC, and PHY may be three separate integrated circuits. Alternately, the CPU 20 and MAC may be combined together in one integrated circuit, with an external PHY. Most recent improvements have all three of the CPU, MAC and PHY in the same integrated circuit. It does not matter which of these or even other alternatives is used as they all perform the same function. A MAC address may be stored in a non-volatile memory 14.

The bridge 10 includes various input-output circuits 16 that connect to various functional devices 29, namely input and/or output devices 30, such as Wiegand-compliant devices, which may be card readers and visible and/or audible annunciators. Input devices 30 may also include open/close sensors for detecting whether a door is open or closed. The bridge 10 also includes various relay, and input status circuits 18 that connect to various other functional devices 29, namely door strikes and digital contacts 32. There may be one or more of the functional devices 29 of the same or different kind connected to the bridge 10.

In the specific case of digital inputs, such as on/off status inputs, the bridge 10 is not limited to any pre-programmed interpretation as to the functionality of the digital inputs, such as "tamper detected", "request to exit", etc. but instead provides dynamic capability to adapt to future functionality because the digital input data is bridged transparently to the CMC 26 for analysis and processing.

Functional devices 29 such as annunciators and also door strikes may be classed as output devices, and any other output device that needs to be controlled may be connected. For example, an RS-485 serial device 23 may be connected to the in-out circuits 16 of the bridge 10 instead of or as well as input-output device 30. The RS-485 serial device may be virtually connected to the CMC 26 via the Internet 8 using the TELNET protocol, for example, so that the CMC 26 could talk to the RS-485 device in parallel with a card-access function of the bridge 10. The bridge 10 is not limited to any pre-programmed interpretation as to the functionality of the digital outputs, such as "open first door", "open second door", etc. but instead provides dynamic capability to adapt to future functionality because the digital output data is passed transparently from the CMC 26 to the output devices. The bridge 10 is not limited to any pre-programmed RS-485 protocol but instead provides a transparent virtual conduit to allow the CMC 26 to remotely communicate with a RS-485 serial device 23, if connected, via the Internet 8.

Various processes may occur in the bridge 10 as the CPU 20 reads computer readable instructions that are stored in the memory 14 located within the CPU integrated circuit 20 or outside it in a separate integrated circuit. The instructions may be written in C-Language then compiled into machine-readable code, for example. One or more of the various processes may be started, for example, by an interrupt service request that is triggered by the hardware of circuits 16 and 18 in the bridge 10 detecting an input.

Specific hardware timer circuits 15 within the CPU 20 operate independently of the programmed-operation by the firmware within the CPU 20, and when said hardware timer circuits 15 expire, an interrupt service request may be generated to process the timer-expiry event.

The bridge 10 may be powered by a 12 Vdc power supply, but other power supplies may also be used, for example, Power over Ethernet (PoE).

The CMC 26 includes a processor and computer readable instructions stored in a digital memory for interpreting communications from the bridge 10 and preparing messages to be sent back to the bridge 10. Such instructions may be written in JAVA, for example, but the use of other programming languages is also possible.

The latency or delay time associated with conveying the data packets between the bridge 10 and the CMC 26 is acceptable due to the usually small amount of data that needs to be transmitted at a single time, and latency in the sub-second range is typical. However, as the amount of data increases, it is likely that faster protocols will be used, which the bridge 10 would be able to accommodate.

The CMC 26 may be configured to log all attempts to enter that are communicated to it via the bridge 10, or it may include or be connected to a logging server that performs this function.

For redundancy, communications to a second CMC, as a backup, may be provided by the bridge 10. A customer may develop his own CMC to communicate with the bridge 10, provided communications are compatible with the data package structure and formatting of the bridge 10. The customer is therefore not restricted to purchasing a CMC from the same vendor as for the bridge 10.

The bridge 10 has a relay output for sending RELAY signals from the circuits 18 to the door strike 32, which may be operated by a relay. The bridge 10 is also configured to receive a door input DOOR signal, which is a signal from another functional device 29 in the form of a sensor that indicates whether a door is open or closed. The bridge 10 is also configured to receive a request to exit (REX) signal, which may originate from another functional device 29 in the form of a push button located near the door through which exit is desired. The bridge 10 is configured to produce a BUZ signal for controlling a buzzer on the Wiegand device 30. The bridge 10 may also be configured to receive and produce other signals and/or signals with other formats depending on which input and output functional devices 29 are desired to be connected to the bridge 10, and which functional features are present in the Wiegand device 30.

The bridge 10 is configured to detect signals which comply with the current Wiegand Protocol, but it is also capable of detecting signals that go beyond the bounds of the existing protocol. For example, the bridge 10 may detect pulses that are more frequent and/or that are shorter than in the existing protocol, and may detect pulse streams that are any length up to 1024 bits long. While 1024 bits have been selected as being adequate for many years, depending on the design of the bridge 10, other maximums may be chosen. The bridge 10 may detect as is, or be configured to detect, signals from other protocols that create a series of pulses, on one, two or more wires, and even signals that have more than two levels on a single wire.

Detected pulses corresponding to bits are built into packets, according to the well known protocol stack for TCP/IP transmission. Conversely, when a packet is received by the bridge 10, it is stripped of its various headers and checksums as it passes through the layers of the TCP/IP protocol stack, to ultimately reveal data bits that may be used for identifying and controlling functional output devices 29, such as door strikes, buzzers, and LEDs.

Figure 4:
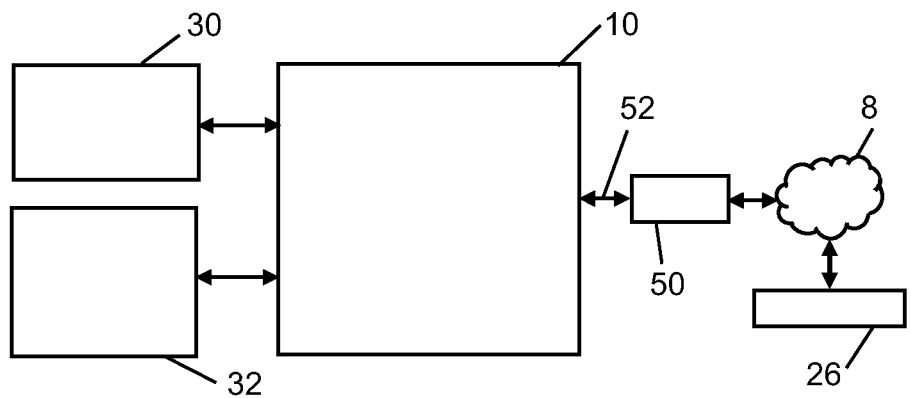
FIG. 4 is a block diagram of the bridge connected to a power over ethernet (PoE) switch.
Figure 5:
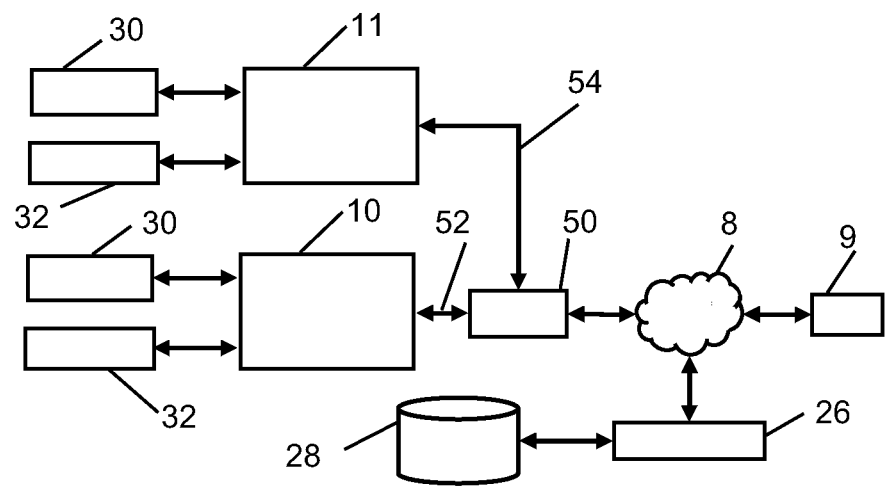
FIG. 5 shows multiple bridges connected to a power over ethernet switch.
Figure 6:
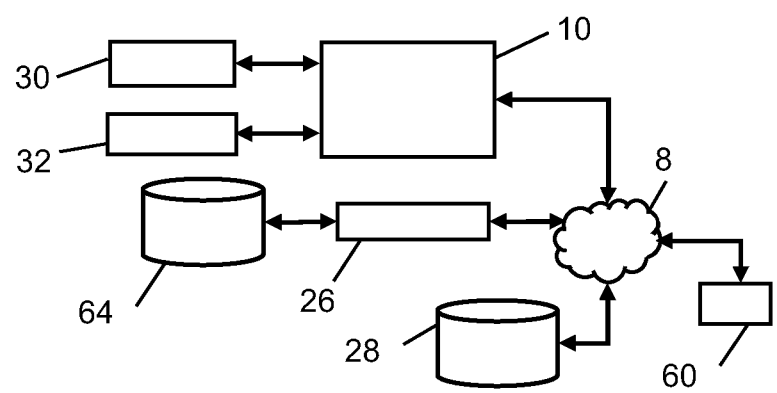
FIG. 6 shows a bridge connected via the Internet to a public key infrastructure server.

There are many configurations in which the bridge 10 may be configured or connected, and the following text describes just a few or them as shown in FIGS. 4-6.

Referring first to FIG. 4, the bridge 10 may be connected to a powered Ethernet cable 52 using Power-over-Ethernet (herein 'PoE') technology. The PoE cable 52 connected to a PoE switch 50, which is an off-the-shelf device capable of providing both power and Ethernet to the bridge 10. The PoE switch is also connected to the Internet 8 as it needs to convey data packets received from PoE devices, such as bridge 10, over the Internet 8 to the appropriate destination.

In the case of a bridge 10 that communicates over a wireless communications channel 22 (FIG. 3) to the Internet, then the wireless bridge would have no PoE cable and would be powered from a local dc power supply at the bridge location. Wireless technology may be used to communicate with the Internet, via the IEEE 802.11 protocol using the most secure and latest implementation thereof. The key functionality of wireless and wired bridges 10 are the same, the difference being only the method of connecting to the Internet.

Referring to FIG. 5, if a second bridge 11 be required at the same remote location, it may be powered from its own PoE cable 54 from the PoE switch 50. Also in FIG. 5, a central permissions database 28 is shown to which the CMC 26 is connected. The database 28 contains details of users, user IDs, permissions, policies etc, which permits the CMC 26 to determine whether or not to allow access to a particular person via a particular door or portal at a particular time and/or day of the week. The use of such a central database 28 eliminates the need to store a different set of user IDs and permissions at each individual bridge 10. Other computers, such as servers, general purpose computers and/or PCs 9 may be connected to the CMC 26 via the Internet or local Ethernet 8. Access to the security program and/or database 28 may be possible via such other computers 9.

Referring to FIG. 6, there is shown another way of connecting the bridge 10 into a security system. In this configuration, the CMC 26 is connected to a local cache 64 of permissions data and the main, central database 28 is connected to the CMC 26 via the Internet 8. In this case the central database 28 may be located remotely from the premises which are to be protected. It is possible that the database 28 be located at multiple remote sites, with multiple mirrors and/or backups. The database 28 may be located in one of Microsoft's Active Directories, for example.

Also shown in FIG. 6 is a connection from the CMC 26 via the Internet 8 to a Public Key Infrastructure (PKI) server 60. The function of the PKI server is to verify whether a particular ID sensed at an input device 30 is valid or not. An extra level of security is added by separating the ID validity check from the policies and permissions check at the database cache 64 or the central database 28.

Every so often, details of personal ID cards, which have become invalid and are stored in the PKI server 60, may be transferred to the central database 28. This may allow the ID validity check to be performed at the central database 28 on data that is managed by the PKI server 60. The PKI server may store both valid IDs and invalid IDs but it may be more efficient to only store or only check for invalid IDs.

An advantage of using a central database 28 is that multiple CMCs 26 may be connected via the Internet 8 to it. Large organizations may have multiple sites, or a presence in multiple locations across the country or around the globe. Each site or group of sites or city may have its own CMC 26, and it would be more useful to have one common user ID and permissions database than to have to maintain several of them.

The identification of a user is provided to a physical device, for example by an RFID fob or card or the entry of a code, and the physical device then provides the identification to the CMC. The provision of the identification by the user may also be considered to be a command to open a door, for example. In other situations and for other physical devices, a user may provide identification and a command separately.

Exemplary Embodiments

Figure 7:
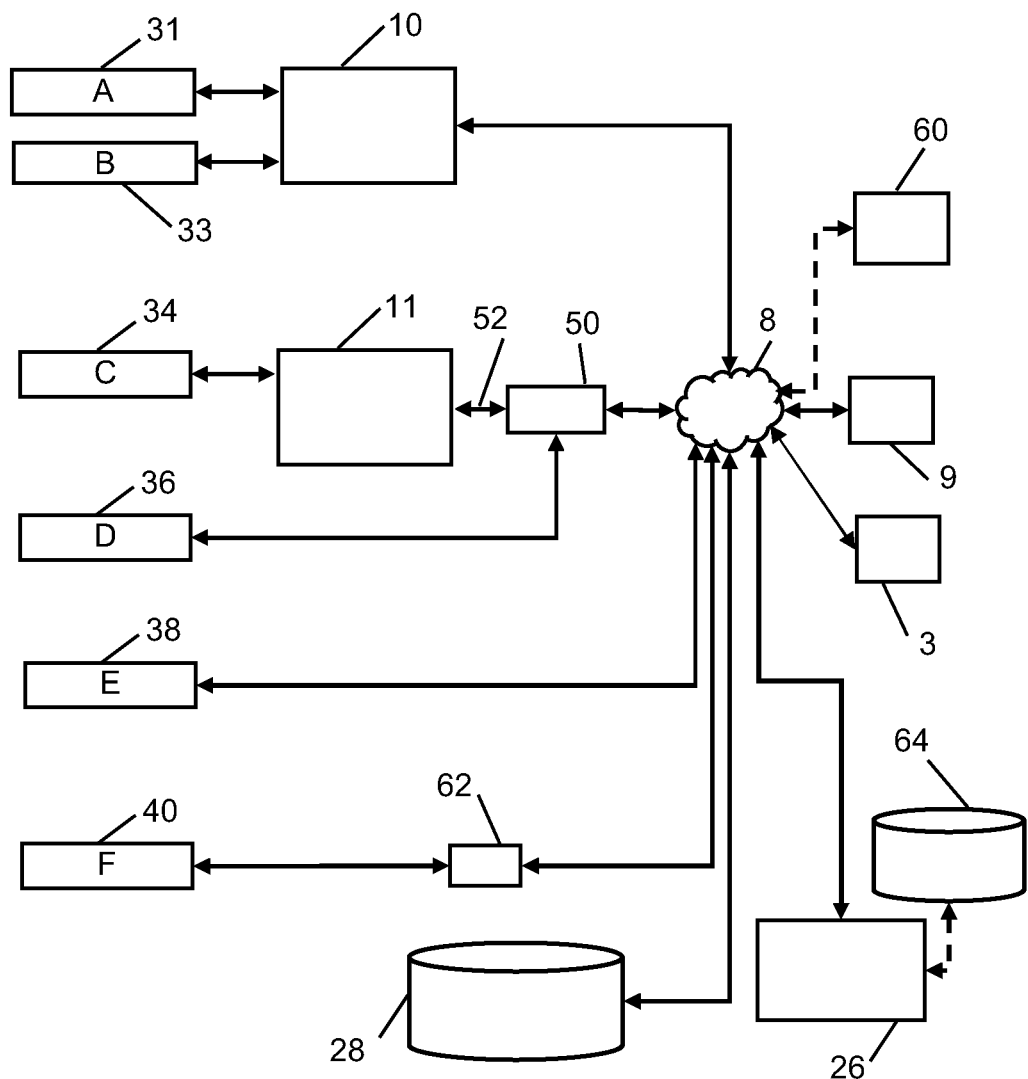
FIG. 7 is a more generalized schematic diagram of a unified permissions system showing various connection options.

Referring to FIG. 7, one or more of physical devices A-F 31, 33, 34, 36, 38, 40 and optionally further devices may be connected via the Internet 8 to the unified permissions system embodied in CMC server 26 and/or permissions database 28.

A device may in fact be a group of one or more physical devices or a physical system. The devices may be IP devices or non-IP devices. If they be non-IP devices, such as Devices A-C 31, 33, 34, they may be connected to the system via a bridge 10, 11 or gateway which has its own IP address. A bridge such as bridge 10 may be powered independently or in the case of bridge 11 it may be powered from a Power over Internet (PoE) cable 52 from a PoE switch 50. Some devices such as Device D 36 and Device E 38 may be configured to connect directly to the Internet 8, either via a PoE switch 50 in the case of Device D 36 or using an independent power source. Device F 40 may, for example, be connectable to the Ethernet or Internet 8 via a computer 62.

A central permissions database 28 is shown to which the CMC 26 is connected via the Internet 8. The permissions database 28 contains details of users, user IDs, permissions, and/or policies etc, which permits the CMC 26 to determine whether or not to allow access to a particular user to control or manage a particular device 31, 33, 34, 36, 38, 40, or access through a particular door or portal at a particular time and/or day of the week. Permissions may be granted in groups, for example, a given user may be granted permission to a group of physical devices, or a group of users may be granted permission together for a given device. The use of such a central permissions database 28 eliminates the need to store a different set of user IDs and permissions at each individual bridge 10, 11 or in the devices 36, 38, 40 themselves. Other computers, such as servers, general purpose computers, PCs, tablets, smartphones, etc. 9 may be connected to the CMC 26 via the local Ethernet or Internet 8. Access to the security program in the CMC and/or to the permissions database 28 may be possible via such other computers 9.

The CMC server may also control access to logical assets 3. These may be directories, files, software applications, printers etc. In other embodiments, the CMC server may be located on two or more servers, and if so, one may be used for logical assets and the other for physical devices.

In an optional configuration, the CMC 26 may be connected to a local cache 64 of permissions data. In this case the central permissions database 28 may be located remotely from the premises which are to be protected or which has the physical devices. It is possible that the directory 28 be located at multiple remote sites, with multiple mirrors and/or backups. The permissions database 28 may be configured using one of Microsoft's Active Directories, for example.

The computer 9 may be a wireless laptop/tablet, which may be used to access the CMC server 26 to configure the devices at installation. For example, an installer could select a connected device from a predetermined pull-down list of possible devices and verify at the location of the installed device that the selection correctly represents the installed device. The installer could operate the device and check that any signals transmitted to the CMC are as expected.

The CMC server may be able to download settings or other parameters to be used in the bridges or connected devices.

Optionally, and shown in FIG. 7, is a connection from the CMC 26 via the Internet 8 to a Public Key Infrastructure (PKI) server 60. The function of the PKI server is to verify whether a particular ID sensed at an input device, for example, or received at computer 9, is valid or not. An extra level of security is added by separating the ID validity check from the policies and permissions check at the database cache 64 or the central permissions database 28. Every so often, details of personal ID cards, which have become invalid and are stored in the PKI server 60, may be transferred to the central permissions database 28. This may allow the ID validity check to be performed at the central permissions database 28 on data that is managed by the PKI server 60. The PKI server may store both valid IDs and invalid IDs but it may be more efficient to only store or only check for invalid IDs.

Device 38, for example, may be controllable by a user operating a computer 9, for example. In this case, identification of the user is supplied via computer 9 to CMC server 26. Since access to the physical device 38 is via a computer interface, it will be usual to require users to input authentication in conjunction with identification. Such authentication may be a password, passcode, biometric data input or other means of authentication. The CMC will verify both the identification and the authentication before granting user access to the device.

Multiple CMCs 26 may be connected via the Internet 8 to the permissions database 28. Large organizations may have multiple buildings, or a presence in multiple locations across the country or around the globe. Each site or group of sites or city may have its own CMC 26, and it would be more useful to have one common user ID and permissions database than to have to maintain several of them.

In a basic embodiment, the permissions database 28 may comprise a database such as shown in Table 1. Columns contain fields that represent permissions for objects. Each object is a representation of a physical device. Rows represent entries for different users, each row indicating whether the respective user has permission or not to access each object. For example, a "Y" represents that a user has permission and an "N" represent that a user does not have permission for the respective object.

TABLE 1

|        | object 1 | object 2 | object 3 | object n |
|--------|----------|----------|----------|----------|
| user 1 | Y        | Y        | N        | N        |
| user 2 | N        | Y        | N        | N        |
| user n | Y        | N        | Y        | Y        |

A simplistic table has been shown to demonstrate the permissions database and it is recognized that a more complex database may be employed. For example, such a database may comprise multiple tables that are related to each other using known relational database languages.

In Table 2, another example of the way the data is structured in the database is shown. In this example, the columns represent memberships of different groups. For example, one group may be 'Employees', another may be 'Managers', a further group may be 'Administrators', a fourth group may be 'Security', etc.

TABLE 2

|        | group 1 | group 2 | group 3 | group n |
|--------|---------|---------|---------|---------|
| user 1 | Y       | Y       | N       | N       |
| user 2 | N       | Y       | N       | N       |
| user n | Y       | N       | Y       | Y       |

In a similar way, Table 3 shows the zones to which groups of users are allowed access. A zone may be a part of a building, for example, or devices or equipment within a building, or a zone may represent a collection of physical devices to which a group of users may collectively be granted access.

TABLE 3

|         | zone 1 | zone 2 | zone 3 | zone n |
|---------|--------|--------|--------|--------|
| group 1 | Y      | Y      | N      | N      |
| group 2 | N      | Y      | N      | N      |
| group n | Y      | N      | Y      | Y      |

Such a permissions database 28 may also contain objects that relate to computers, printers, electronic assets, network resources etc. as well as the physical objects. Each object represents a single entity or a group of entities, and its attributes. Objects may contain other objects due to the hierarchical or tree structure often employed in such directories. An object is uniquely identified by its name and has a set of attributes that are defined by a schema or set of rules. The attributes of each object may be defined using a commonly known protocol, such as the Lightweight Directory Access Protocol (LDAP).

An object may represent a part of a physical device or system, and as a result, a given physical device or system may have multiple objects. For example, a general user may have permission to adjust a thermostat by a few degrees but a building manager may have permission to turn the thermostat on and off. The adjustment and on/off functions would be represented by different objects, and these may be objects that are contained within an overall building temperature management or HVAC object.

When a user logs onto a network via a terminal he will automatically have access to the physical devices for which he has been granted permission as defined in the permissions database. There will be no need to enter a separate user name and password for each individual physical device or system that he wishes to control.

Figure 8:
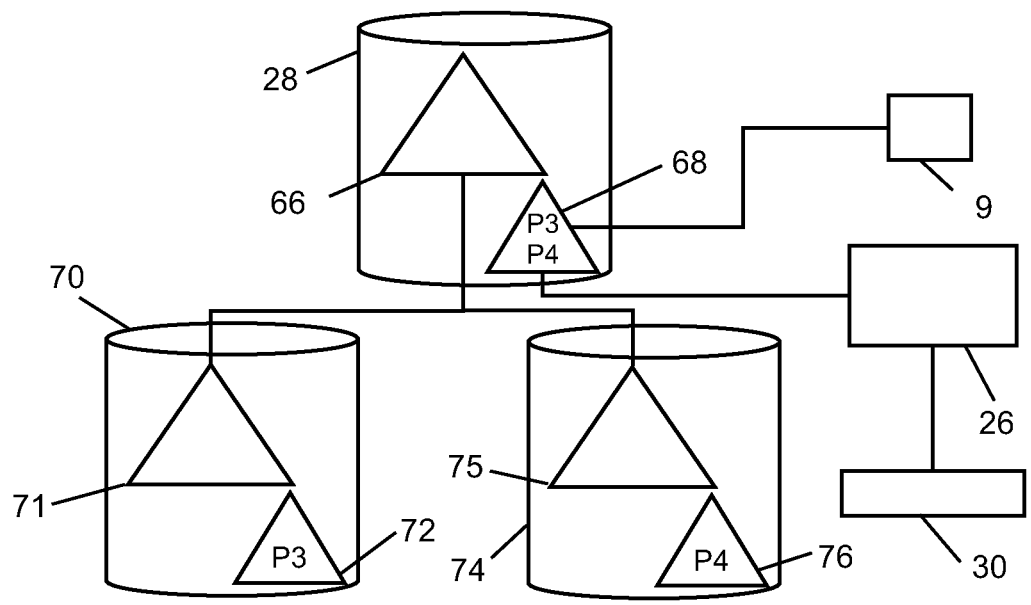
FIG. 8 is a schematic diagram of a permissions database structure.

FIG. 8 shows an example of how a permissions database 28 may be divided and replicated. For example, the permissions database 28 may comprises two smaller databases, one database 66 for logical assets and one database 68 for physical devices. This may be implemented using Microsoft's Active Directory, for example, by using a default schema and settings in database 66 for controlling access to the logical assets of an enterprise. A partition may be made using the Lightweight Directory Service (LDS) to form a physical device permissions database 68 in which the definitions of the devices, their locations and their zones are stored, as well as the user groups to which permissions have been assigned. Different group permissions may be denoted P3 and P4, for example. Membership of users in the groups may also be stored in database portion 68. The physical device permissions database 68 may use or access details of some or all of the users defined and stored in the logical permissions database 66. A benefit of separating, or at least partially separating the two databases, is that it will permit different administrators to manage each one separately, if required. For example, an enterprise may have an IT administrator who is different from the physical security administrator.

The permissions database 28 may be replicated, in full or in part, to form copies in other locations. For example, permissions database 70 may include a copy 71 of the logical permissions database 66, and a partial copy 72 of the physical device permissions 68 including permissions P3 but not P4. As another example, permissions database 74 may include a copy 75 of the logical permissions database 66, and a partial copy 76 of the physical device permissions including permissions P4 but not P3. The permissions for the logical assets may also be divided up when replicating the main permissions database 28.

The permissions P3 and P4 may be accessed by an administrator using a general purpose computer 9, for example. The connection may be made through an Ethernet or the Internet, and the same computer 9 may also be used for accessing the permission for the logical assets in database portion 66. The CMC server 26, which is used for receiving signals from and sending signals to the physical devices, is also connectable to the physical permissions portion 68 of the permissions database 28. The CMC 26 in turn is connected, via a network, to physical devices such as Device 30. In some embodiments, the CMC server 26 and the permissions database 28 may be located on the same server.

Figure 9:
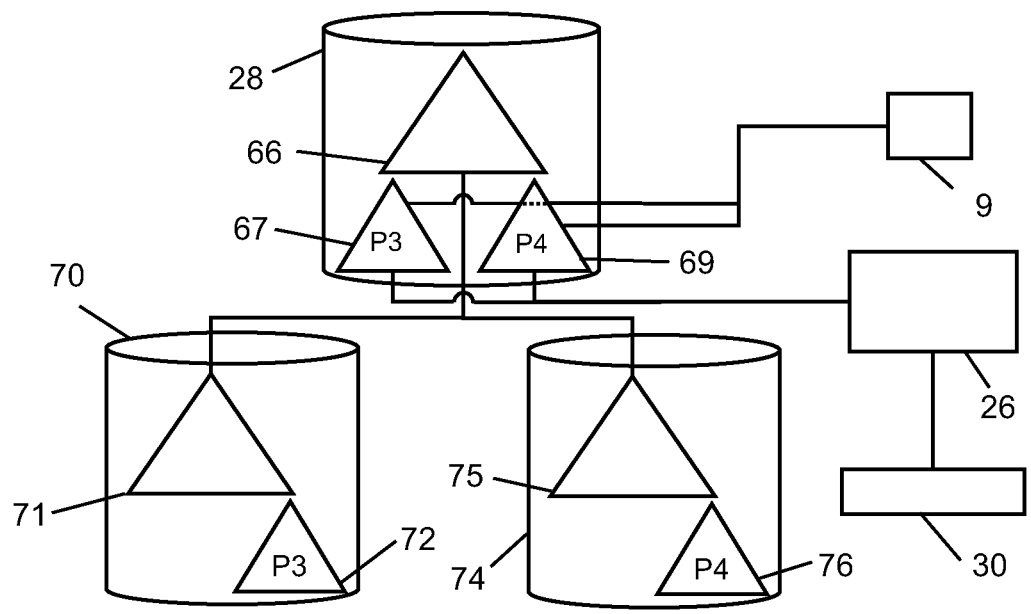
FIG. 9 is a schematic diagram of an alternate permissions database structure.

In FIG. 9 an alternate arrangement is shown that separates P3 and P4 into two instances 67, 69 of the Active Directory Application Mode/LDS. In this arrangement we can have the root domain controller host multiple instances of Active Directory Application Mode/LDS instances. The permissions P3 and P4 may be accessed by an administrator using a general purpose computer 9 connected to instances of P3 67, and P4 69. As above, the CMC server 26, which is used for receiving signals from and sending signals to the physical devices, is connected to the separated instances 67, 69 of the physical permissions portion of the permissions database 28. Replication works in pretty much the same way as in the previous arrangement, except that P3 and P4 are now separately replicated to their corresponding branches 72, 76. Each instance contains information pertaining to control areas, physical devices and access rules relevant to a specific building or geographic area. In this way, different areas maintain a certain level of autonomy of access control rules while sharing the centralized users and groups information as provided by the domain Active Directory 66.

A further advantage of using an existing system such as Active Directory, or any other equivalent logical security system, is that a physical device permissions database may be added to an existing set-up, without compromising the security of the IT assets.

We have given examples of embodiments in which the users are defined in the logical permissions portion 66 of the permissions database 28, and the access groups, zones, and devices are defined in the portion 68 of the permissions database. However, the division may be different in other embodiments, in that one or more of the access groups, the areas, and the devices may be defined in the main portion 66 of the permissions database.

Figure 10:
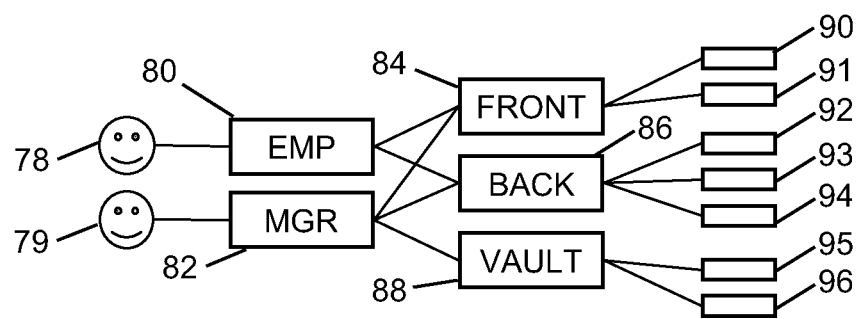
FIG. 10 is a schematic diagram showing associations of users, groups, zones and devices.

FIG. 10 shows users 78, 79 recorded as being members of Employee group 80 and Manager group 82, respectively. The Employee 80 group of users has access to the Front area 84 of a building, which may have in it physical devices 90 and 91, and Back area 86 of a building, which may include physical devices 92, 93 and 94. Such devices may be doors, for example. The Manager group 82 of users has access to the Vault zone 88 as well as the Front 84 and Back 86 areas of the building. The Vault zone may include devices such as a door 95 and a safe 96.

Figure 11:
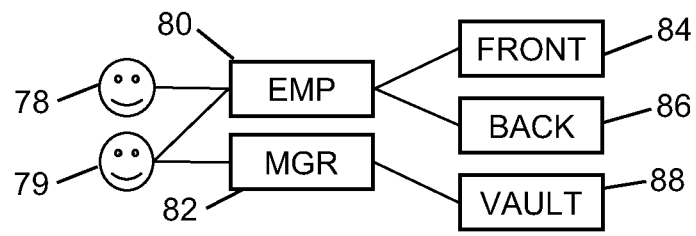
FIG. 11 is a schematic diagram of associations of users, groups and zones.

FIG. 11 shows an alternative set up, where users may belong to more than one group. In this case, user 78 is in the Employee group 80, having access to devices in the Front area 84 and Back area 86 of the building. The user 79 is a manager and belongs to the Employee 80 and Manager 82 groups, the Manager group 82 having access to the Vault area 88.

Figure 12:
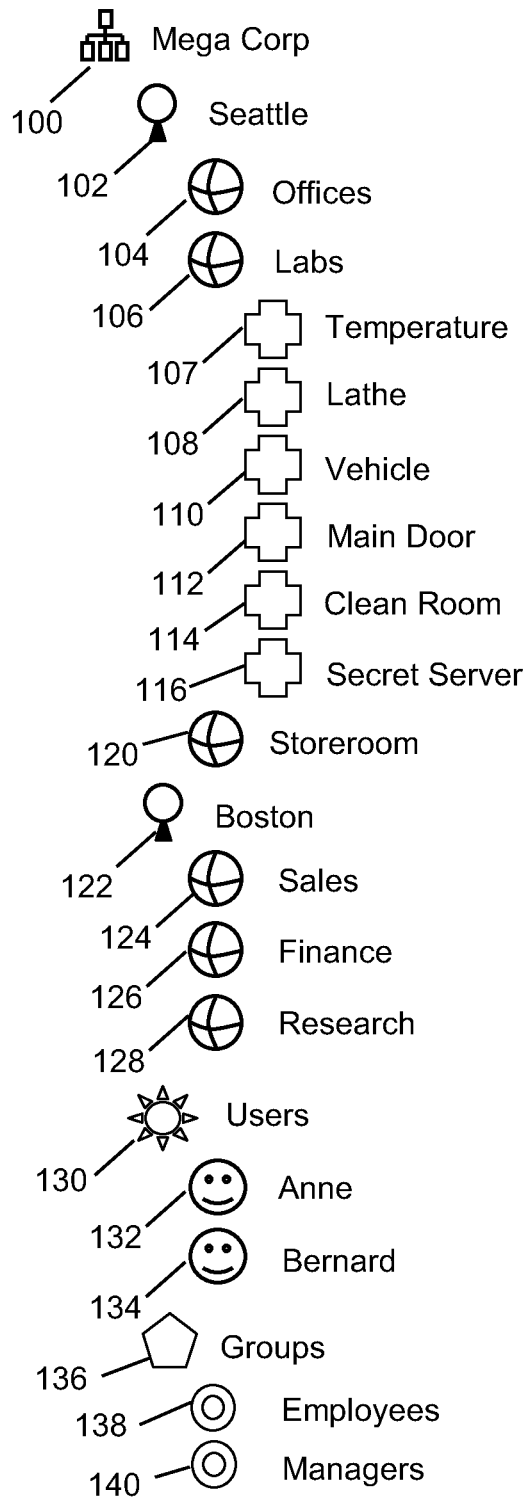
FIG. 12 is a view of objects that have been defined in a unified permissions system.

Referring to FIG. 12, when an administrator logs on using computer 9 (see FIGS. 8 and 9) he may browse to the permissions database 28 which, for example, may result in the display of a hierarchical tree including physical devices connected to the system, the groups and the users. The permissions database 28 may apply to a worldwide corporation or enterprise 100 shown at the "forest" level with sites in Seattle 102 and Boston 122, for example, at the "tree" level. Each site may be further broken down into domains (i.e. zones or areas), such as offices 104, labs 106, storeroom 120, or they may be broken down into organizational units such as sales 124, finance 126, research 128, etc. Users may work in the labs 106, for example, and have access to physical devices such as temperature control 107, a lathe 108, a company vehicle 110, access through the main door 112, access to the clean room 114, etc. These domains may, for example, be defined in the Lightweight Directory Service of Microsoft's Active Directory, or in the Active Directory Application Mode. Also included in this list may by access to traditional logical resources such as a top secret server 116. By clicking on an icon 107, 108, 110, 112, 114, 116 representing an object, or the name of the object, a control interface for the object may be displayed on the administrator's computer terminal 9, which may allow the administrator to change the attributes of the object.

Users 130 may also appear in the list, such as Anne 132 and Bernard 134. Groups 136 that have been defined may also appear, such as employees 138, managers 140, etc. The use of groups is preferred to organizational units, as a user may be a member of more than one group, which allows for greater flexibility when assigning permissions to physical devices. However, organizational units may still be used if embodiments are desired where a user can only be a member of one organizational unit, or department.

The list of objects may be shown as a traditional tree structure, and the objects, or links to them may be stored in any hierarchy desired by the administrator. As with files displayed in file browsers, details or attributes of each object such as type, size, date of creation, etc. may optionally be displayed alongside each object. The way the list is displayed may be independent of the way the permissions for each user are stored.

Referring again to FIG. 12, for example, when a user logs on using computer 9 he may browse to the permissions database 28 which will result in the display of a hierarchical tree of physical devices to which the user has permission. In this case, only objects to which the user has permission will be displayed, such as items 100-128. Alternatively, all may be displayed, but the inaccessible ones may be grayed out. By clicking on an icon 107, 108, 110, 112, 114, 116 representing an object, or the name of the object, a control interface for the object may be displayed on the user's computer terminal 9, or if it is an entry device, for example, it may be sent an instruction to operate. For example, a door lock device may be instructed to open.

Figure 13:
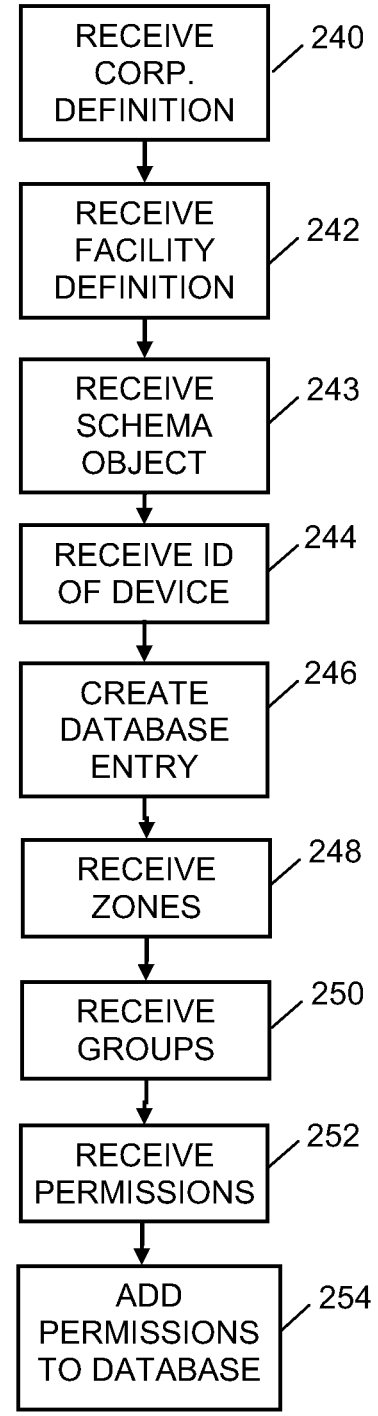
FIG. 13 is a flowchart for setting up a unified permissions system.

Referring to FIG. 13, a flowchart is shown that indicates how the unified permissions system may be set up. For example, a corporation may be defined 240 by an administrator accessing the CMC through a PC and entering a name and optionally a description and identification number. Similarly, the system may receive 242 one or more facility definitions, for facilities within the corporation. Such definitions may be possible using default objects and attributes that are already defined in a schema for the database. Each facility may further be divided into domains, rooms, functions etc. Physical devices will need schema objects creating, for each new type or class of physical object. The system may receive 243 such new schema objects from an administrator. For example, a schema class added to the system may be a zone or area for which access permissions are to be granted. Other examples of schema classes may be an access group, card, a schedule, or a device, etc. Schema attributes may be user ID, schedule ID, schedule hours, device type, card data, etc.

The administrator may then provide 244 identification of each physical device that is attached to the system. Identification is achieved by completing the available fields that have been previously been defined within the unified schema for the objects, which may be physical or logical assets. The system creates 246 a database entry for each physical device connected to the system. The administrator enters 248 the areas or zones to which the devices are associated, then defines and enters 250 the groups of users. Once the groups are defined, the administrator then provides permissions to the system, which receives 252 them and adds 254 them to the permissions database.

Figure 14:
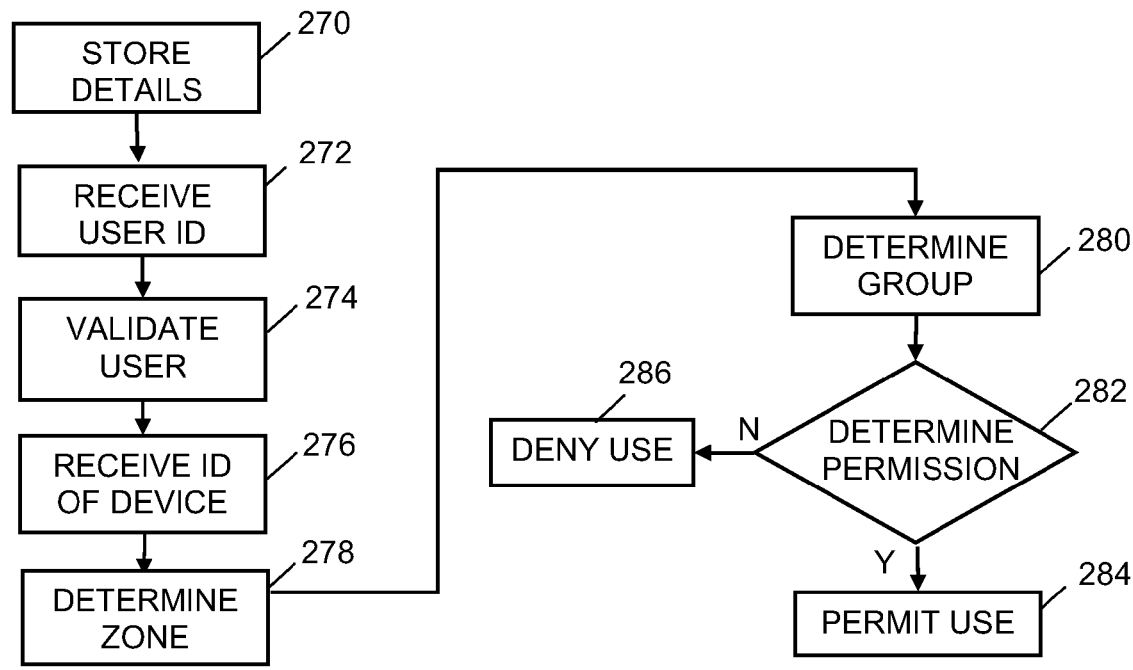
FIG. 14 is a flowchart for permitting user access to a physical device.

FIG. 14 is a flowchart showing how a user may be permitted access to a physical device. In step 270, the permissions database is set up by storing details of users, physical devices, zones in which physical devices are located, groups to which users belong, and permission of groups to zones. The system then receives 272 an identification of a user wishing to use or have access to a physical device or through a portal controlled by a physical device. The system validates 274 the user, which may include validating the identity provided or validating both the identity and a password also provided. In step 276, the system receives identification of the device the user wishes to use. The zone in which the device is located is then determined 278, and the group to which the user belongs is also determined 280. Next, at step 282, the system determines whether the determined group has permission to access the determined zone. If permission has been granted, the system permits 284 use of the device. If permission has not been granted, the user is denied 286 use of the device.

Visitor Management

The permissions system may be used for visitor management. Each visitor may be recorded as an object in the permissions database, which will also store the permissions that have been granted to the visitors for accessing the physical devices in the premises. The physical device for which permission is granted may, for example, be the main entrance and the exit doors. The visitor may be given an identifiable fob or key card that can be used at door access readers. The fob or key card itself may be recorded as an object in the permissions database, and permissions may be granted to the fob or key card. Times and days for which access to the physical objects is granted may also be stored in the permissions database. In other embodiments, a visitor may be given a username and password, which may be used for accessing computers, files, machinery, building controls etc.

By using a central permissions database, a given visitor that visits multiple sites of the same company may more easily be managed. Likewise, employees at one site of a company may more easily be managed when visiting other sites of the same company.

Detailed Operation of a Bridge

Figure 15:
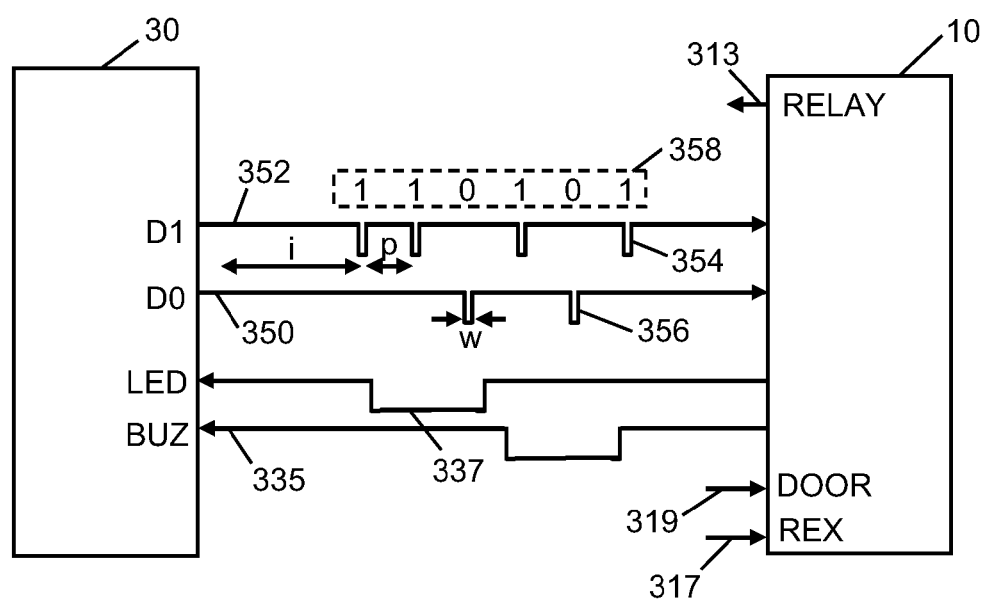
FIG. 15 is a schematic diagram of signals communicated between a bridge and a reader device.

Referring to FIG. 15, there is shown a schematic diagram of electrical pulses transmitted between the bridge 10 and Wiegand reader and annunciator device 30. The bridge 10 has a relay output for sending RELAY signals 313 from the circuits 18 (FIG. 3) to the door strike 32, which may be operated by a relay. The bridge 10 is also configured to receive a door input (DOOR) signal 319, which is a signal from another functional device 29 in the form of a sensor that indicates whether a door is open or closed. The bridge 10 is also configured to receive a request to exit (REX) signal 317, which may originate from another functional device 29 in the form of a push button located near the door through which exit is desired. The bridge 10 is configured to produce a BUZ signal 335 for controlling a buzzer on the Wiegand device 30. This signal may change state from high to low when the buzzer needs to be turned on, and vice versa for switching the buzzer off. The bridge 10 is also configured to produce a LED signal 337 for controlling an annunciating LED on the Wiegand device 30. This signal may change state from high to low when the LED needs to be turned from off to on, and vice versa for switching the LED off. There may be one or more LEDs that may be red, green, or other colours. Each LED or colour of LED may indicate a different state, such as access permitted, access denied or a problem. The bridge 10 may also be configured to receive and produce other signals and/or signals with other formats depending on which input and output functional devices 29 are desired to be connected to the bridge 10, and which functional features are present in the Wiegand device 30. The approximate timing of the output signals that are produced may be determined by the CMC 26. Another functional output device 29 may be configured to sound a buzzer for a predetermined duration of time, so in this case, and other similar cases, the CMC will only send a trigger bit to such functional device 29.

The Wiegand device 30 uses two wires for data transmission, usually called D1 (or DATA1) and D0 (or DATA0). There is usually a common ground, not shown, that is connected between the Wiegand device 30 and the bridge 10. When no data is being sent both D0 and D1 are at a high voltage 350, 352 which is nominally 5V. When a "1" is sent, a low pulse 354 is created on the D1 wire while the D0 wire stays high. When a "0" is sent, a low pulse 356 is created on the D0 wire while the D1 wire stays high. Pulses have a width w, which is typically between 20 μs and 100 μs, and are separated by a time period p, which ranges from about 200 μs to 2 ms. The time duration marked "i" is an idle time period during which no further pulses in a given message are detected. A train of pulses outputted by the Wiegand device 30 represents a series of bits 358 which may correspond to data held in a personal card or fob that is read by the Wiegand device 30.

The format of the pulses is known as the Wiegand Protocol. Presently there are two common versions of the Wiegand Protocol, one with a 26-bit data stream and the other with a 36-bit data stream. Future protocols may have fewer or more bits, and the width w and/or intervening period p of the pulses may be modified by future enhancements to the Wiegand Protocol. Different voltages may be used for the signal levels, for example, 4V or 5.5V may be used for D1 and D0 when no data is being transmitted, and the low level for when a data pulse is being transmitted may be from 0V up to 1V. Still, other voltages may be used. For the auxiliary functional devices 29, such as the buzzer, LED and door strikes, the signal level may also by nominally 5V, but with a greater tolerance. The Wiegand device 30 may be powered by the bridge 10, for example with 12 Vdc, but other voltages are also possible, and the Wiegand device 30 may alternately have its own power source.

The bridge 10 is configured to detect signals which comply with the current Wiegand Protocol, but it is also capable of detecting signals that go beyond the bounds of the existing protocol. For example, the bridge 10 may detect pulses that are more frequent and/or that are shorter than in the existing protocol, and may detect pulse streams that are any length up to 1024 bits long. While 1024 bits have been selected as being adequate for many years, depending on the design of the bridge 10, other maximums may be chosen. The bridge 10 may detect as is, or be configured to detect, signals from other protocols that create a series of pulses, on one, two or more wires, and even signals that have more than two levels on a single wire.

Figure 16:
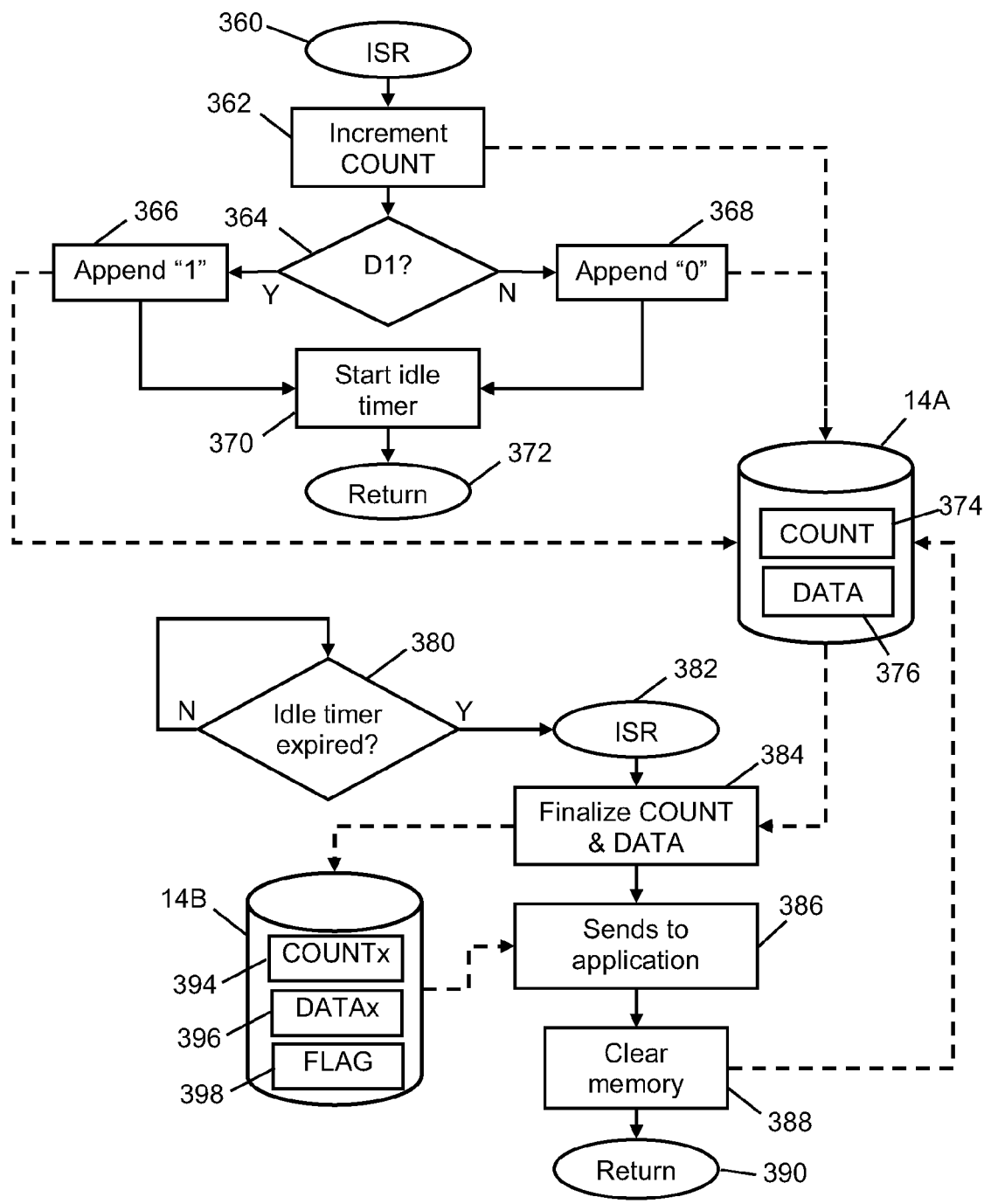
FIG. 16 is a flowchart of some of the steps of an interfacing method performed by the bridge in accordance with the present invention for building detected input signals into a store of data.

Referring to FIG. 16, there is shown a flowchart of an exemplary embodiment of some of the steps in the interfacing method in accordance with the present invention that occurs in, or mostly in, the CPU 20 of the bridge 10. These steps of the method create temporary variables in memory corresponding to pulses transmitted from a Wiegand reader device 30 and detected by the bridge 10.

When an input signal is detected by an input circuit 16 in the bridge 10, the input circuit, in step 360, sends an interrupt service request (ISR) to the CPU 20. Provided there are no other processes running that have been triggered by prior interrupts, in step 362 the CPU 20 then increments a variable called COUNT designated 374 in memory 14A, which may be a portion of memory 14. If this be the first pulse in a train of pulses, then COUNT 374 may be incremented from 0 to 1. In step 364 the CPU then determines whether the pulse is a 1 or not. If the pulse has been received on the D1 line, then it is a 1 and a bit of value 1 is appended in step 366 to a variable called DATA designated 376 in memory 14A. If this be the first bit of the train of pulses, then at this point the variable DATA will consist of a single bit of value 1. If, at the decision point in step 364, the pulse has not been received on the D1 line, then it must have been received on the D0 line, and therefore corresponds to a bit of value 0. In this case, a 0 is appended to the variable DATA 376 in memory 14A. As an alternative to ISR 360 processing both D1 and D0 interrupts within one Interrupt Service Routine, the bridge 10 may be programmed to process D1 and D0 interrupts independently, thereby not requiring the decision 364 to determine whether to append a 1 or a 0 to the variable DATA 376 in memory 14A.

After the appropriate bit has been appended to the variable DATA 376, in step 370 the CPU 20 starts the idle timer of timer circuits 15. The idle time may be set to twice the maximum interval p between successive data pulses, or it may be set to some other desired value. The idle timer may count upwards or downwards. The principle of the idle timer is to measure a length of time long enough to make a determination that the last of a train of pulses has been received at the bridge 10. By using the idle timer to detect that the last pulse of a train has been received, pulse trains of many different lengths may be detected without having to configure the bridge 10 to always accept the same number of pulses. As a result, Wiegand or other protocols that are longer than current ones may be detected without any hardware, firmware or software change to the bridge 10. For example, it is conceivable that 75-bit, 128-bit, 200-bit, 256-bit or other bit-number Wiegand protocols may be developed. After the idle timer is set, in step 372 the process returns control of the CPU 20 to what it was doing before the ISR in step 360 or to another process for which an interrupt has been requested and queued.

In step 380 the bridge 10 monitors whether or not the idle timer has expired. Specific hardware timer circuits 15 within the CPU 20 operate independently of the programmed-operation by the firmware within the CPU 20, and when the hardware timer circuits 15 expire, in step 382 an interrupt (ISR) is generated to process the timer-expiry event. If the hardware timer circuits 15 have not expired, no action is taken. In particular, if the hardware timer circuits 15 have not expired by the time a subsequent pulse is received by the bridge 10, then another interrupt service request is created in step 360. The process moves through the upper part of the flowchart, incrementing the variable COUNT 374 by 1, appending either a 0 or a 1 to the variable DATA 376 and restarting the idle timer in step 370. This process is repeated as many times as data signals are received provided that the idle timer does not expire.

If in step 380 the idle timer expires, in step 382 another ISR is sent to the CPU 20. The fact that the idle timer has expired indicates that the entire message, or train of pulses, has been received. The temporary variables COUNT 374 and DATA 376 are then finalized in step 384. The values of COUNT 374 and DATA 376 are copied to final variables COUNTx designated 394 and DATAx designated 396 in memory 14B and a message (FLAG) flag designated 398 is set to indicate that these variables are ready for sending to the CMC 26 in the form of a message. The variables may be stored in the memory 14B, which may be part of memory 14. The CPU 20 then in step 386 sends the final variables COUNTx 394 and DATAx 396 to an application running in the CPU 20 for further processing and transmission to the CMC 26. The temporary memory 14A is then cleared in step 388, such that COUNT 374 is set to zero and DATA 376 is null. In step 390 the process then returns allowing the CPU 20 to continue what is was doing before the ISR was received in step 382, or to start another process for which an interrupt is queued.

Figure 17:
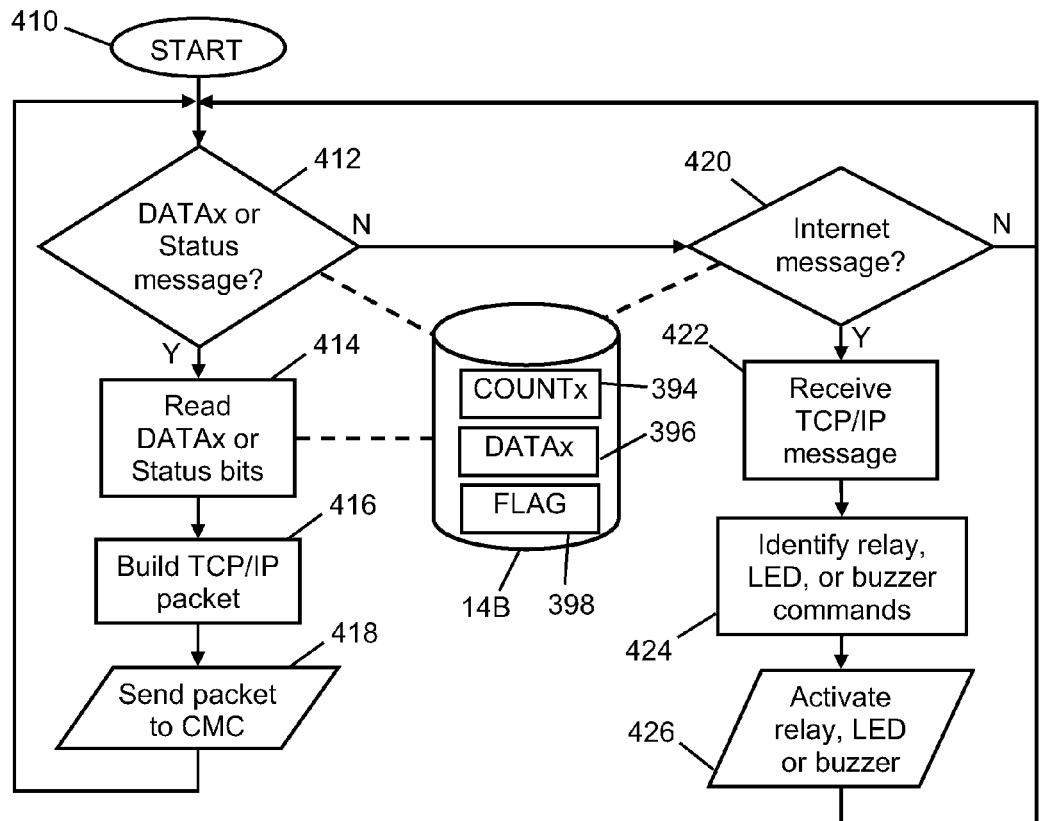
FIG. 17 is a flowchart of other of the steps of the interfacing method performed by the bridge in accordance with the present invention for transmitting stored data to a control and monitor computer (CMC).

Referring to FIG. 17, there is shown a flowchart of an exemplary embodiment of other of the steps of the interfacing method in accordance with the present invention, constituting an expansion of step 386 in FIG. 16, in which the final variables COUNTx and DATAx are subjected to processing by an application running in the CPU 20 and then sent to the CMC 26. After the processing has started in step 410, the CPU is continually and frequently looking at message (FLAG) flag 398. If the flag be set, in step 412 the CPU 20 determines by looking at the flag 398 whether the message received is one that contains Wiegand data originating from the D1 and D0 lines (DATAx), or whether it is a different type of message, such as a DOOR signal 319 from a door sensor or a REX signal 317 (Status). The flag 398 may comprise multiple flags, of which one may indicate that a Wiegand message is ready and others that input status bits generated by the in-out circuits 18 have changed, for example from old values to new values depending on signals detected from the functional devices 30.

If, in step 412, the CPU 20 determines that the message is a D1/D0 type message, then the bits of the message, i.e. the bits of COUNTx 394 and DATAx 396, are read in step 414 from the memory 14B. The bits that have been read are then built in step 416 into a TCP/IP packet and sent in step 418 to the CMC 26.

If, in step 412, the CPU 20 determines that the message is a Status type message, then the bits of the message, i.e. the Status bits, are read in step 414 from the input circuits 16. The bits that have been read are then built in step 416 into a TCP/IP packet and sent in step 418 to the CMC 26.

If, in step 412, the CPU 20 determines that the message is neither a D1/D0 nor Status type message, then the CPU 20 determines in step 420 whether the MAC 12 is indicating the presence of an Internet message (from the CMC 26) that needs to be processed. If it be another type of TCP/IP message, then the message is received in step 422. The CPU then identifies in step 424, for example, commands for the buzzer, a relay, or an LED, the corresponding one of which is then activated in step 426 by sending a corresponding signal to the relevant functional output device 29.

If in step 420 there be no message, or after a message has been sent in step 418 to the CMC or sent in step 426 to activate an appropriate one functional output device 29, the process returns to step 412.

Figure 18:
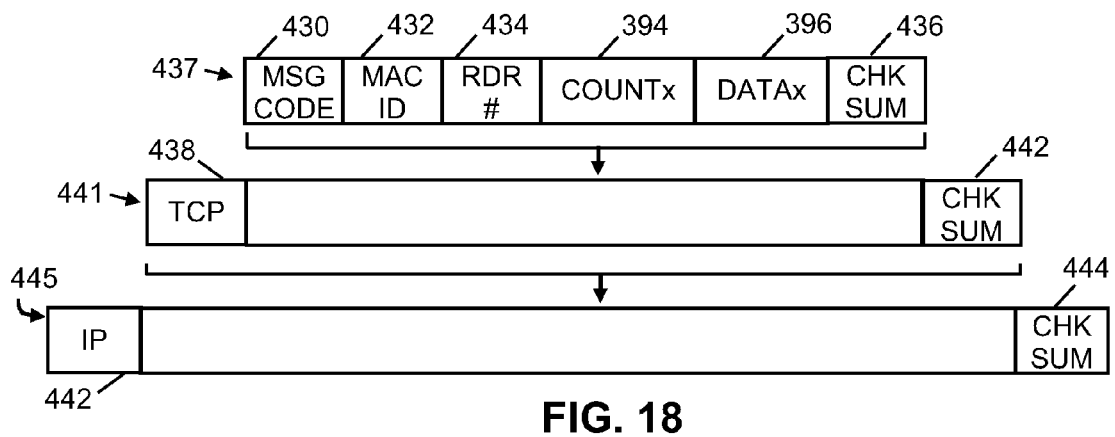
FIG. 18 shows data embedded in various packets used for transmission.

As shown in FIG. 18, the COUNTx 394 and DATAx 396 bits are built into packets, according to the well known protocol stack for TCP/IP transmission. The packet created by the application running in the CPU has: a message code 430 at the start to identify the type of message encoded, be it Wiegand, Status, Command, and the like, followed by the MAC address 432 or other identification of the particular bridge 10; followed by the reader number 434 for embodiments where more than one reader device 30 may be connected to the bridge 10; followed by the variable COUNTx 394 indicating the number of data bits; followed by the bits of data themselves DATAx 396; followed by a checksum 436.

Some examples of possible message codes 430 for communication packets sent from the bridge 10 to the CMC 26 are:

Msg Code=128, means Card Reader Tag DATAx
Msg Code=129, means Contact Input Point Status
Msg Code=130, means bridge Information
Msg Code=131, means Acknowledge Receipt of previous command Some examples of possible message codes 430 for communication packets sent from the CMC 26 to the bridge 10 are:

Msg Code=0, means Activate Relay Command
Msg Code=1, means Get Contact Input Point Status
Msg Code=2, means Get bridge Information
Msg Code=3, means Acknowledge Receipt of previous reply
Msg Code=4, means Set Power-On State of Output Points The numbers for the message codes 430 are chosen to be unique. Each message code number ensures that both the CMC 26 and the bridge 10 know the content of the packet and process it correctly.

This application packet 437 is then embedded in a transmission control protocol packet 441, which has a TCP header 438 and a TCP checksum 440 added therein. The TCP packet 441 is further embedded in an IP packet 445, which has an IP header 442 and an IP checksum 444 added therein. The data is now ready for transmission to the CMC 26. For presently conceivable lengths of DATAx 396, the message will fit into a single IP packet, although in the future, if very long messages are desired, then two or more packets may be needed.

Conversely, when a packet is received by the bridge 10, it is stripped of its various headers and checksums as it passes through the layers of the TCP/IP protocol stack, to ultimately reveal data bits that may be used for identifying and controlling functional output devices 29, such as door strikes, buzzers, and LEDs. The format of the data may be, for example, similar to that used for Wiegand packet 437 with the COUNTx and DATAx replaced by control bits for the various door strikes, buzzers, and LEDs.

Figure 19:
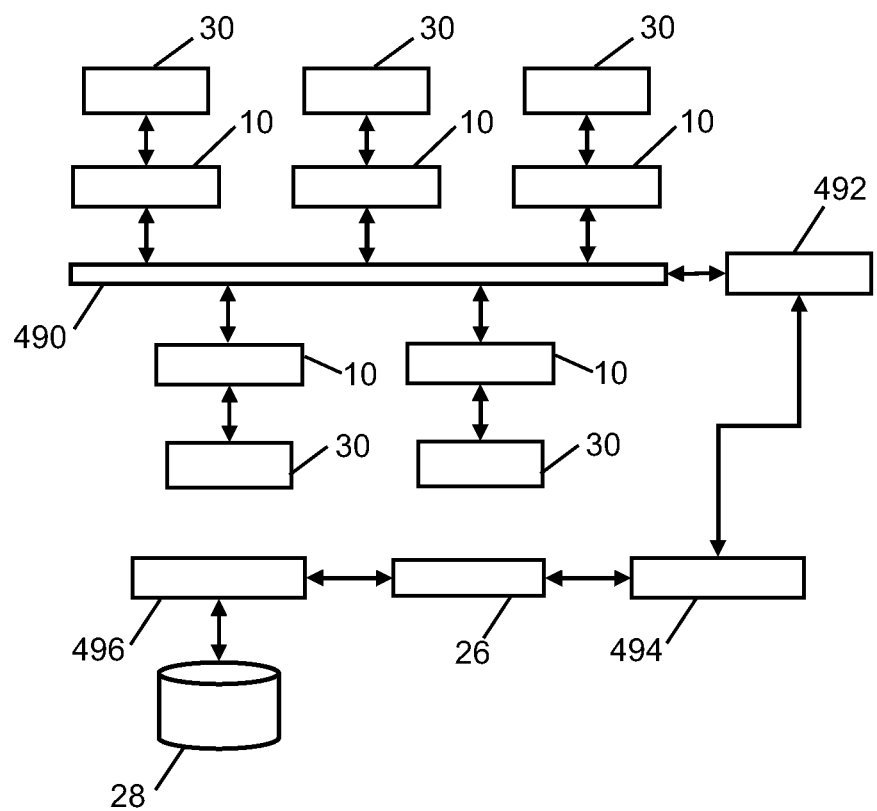
FIG. 19 shows multiple bridges connected via a router to a CMC.

A further example of connecting one or more bridges to a network is shown in FIG. 19. Here, multiple bridges 10 are connected to an Ethernet cable 490. The bridges 10 are connected via a router 492, through a firewall 494 to a CMC 26. The CMC 26 is connected in turn via another firewall 496 to the central database 28.

Door Token Access System

Figure 20:
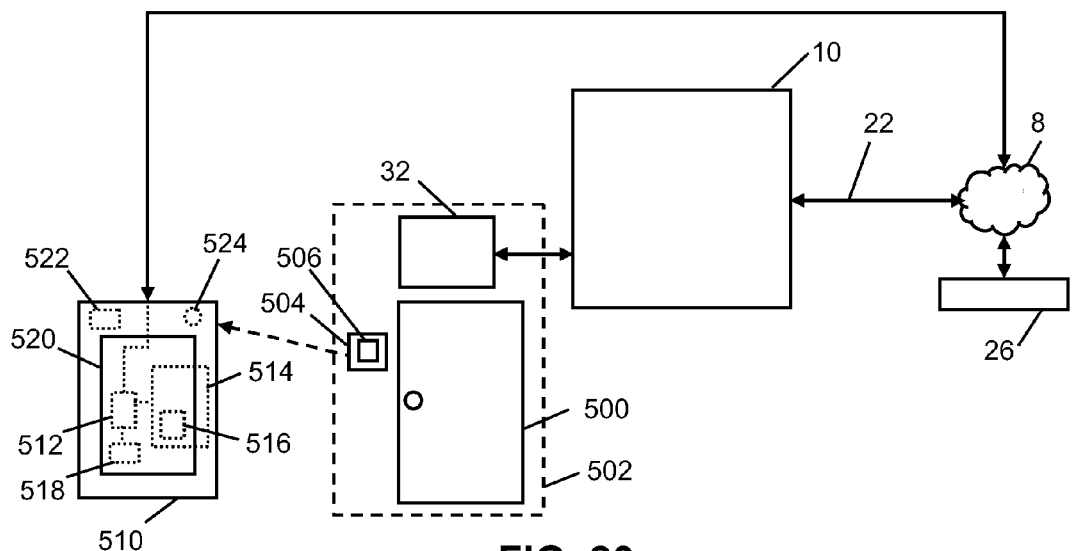
FIG. 20 shows a system with a door token that is read by a personal mobile device.

Referring to FIG. 20, there is shown an exemplary embodiment of a system that is configured to use door tokens. It includes a bridge 10 connected by communications link 22 to the Internet 8, and a CMC 26 also connected to the Internet. Connected to the bridge 10 is a door strike 32 that is used to lock and unlock door 500, which may in fact be any kind of physical portal that can be locked and unlocked. The associated components 502 of the door 500 include a unique identifying door token 504 placed in proximity to the door. The token 504 contains a unique identifier 506 that identifies the door. A personal mobile device 510 that is carried by a user wishing to enter through the door 500 is shown in the vicinity of the door token 504. The personal mobile device 510 includes one or more processors 512, memory 514, one or more applications 516 stored in the memory, a unique identifier 518, and user interface 520, which may be a multi-touch screen, for example. Also included is an NFC reader 522 and/or a camera 524.

The camera 524, for example, may be used to take a snapshot of door token 504, if the door token is a QR code. The application(s) 516 may interpret the unique door code contained in the QR code and transmit the unique door code and the unique identifier 518 of the personal mobile device via a communication link and via the Internet 8 to CMC 26. The unique identifier of the personal mobile device 510 may be a MAC address, for example, stored in firmware or hardware memory, it may be an identifier derived from the MAC address, or it may be an identifier assigned to the personal mobile device by the CMC 26 and stored in the memory 514. The CMC 26 then decides whether to send an open signal to the bridge 10, based on whether the user of the personal mobile device 510 has been authorized to enter through door 500, the details of the user and the unique identifier 518 of the user's personal mobile device 510 having been previously associated in the CMC 26 database, together with permission levels for that user to access the door. If the user has been granted permission to open the door 500, the CMC 26 forms an IP packet containing the open door signal and sends it to the bridge 10, which then removes the IP headers, extracts the open door signal and passes it to the output of the relay circuits 18 to which the door strike 32 is connected. The bridge 10, being configured to operate transparently, has no regard to what the IP packet contains, except to determine which output of the bridge to send it to and what to send, both of which are contained in the packet and generated by the CMC 26. As a result, the CMC 26 has decision-making control over the operation of the door strike and other functional devices 29, and the packets it generates can be tailored to many different types of functional device and their different command and control protocols.

As in other embodiments, the door strike 32 may include digital contacts for detecting whether the door is open or closed and for sending signals representing such door state to the bridge 10.

The application(s) 516 may be configured in many different ways. They may transmit the QR code to the CMC server 26 for interpretation there. They may be configured to automatically detect the presence of a QR code in the field of view of the camera 524, subsequently take a photo of it and then automatically send it and an identification of the personal mobile device to the CMC 26. Alternately, the application(s) 516 may be configured such that a user must enter a PIN code or a password in the mobile device before the application opens and is able to capture an image or reading of the door token. As a further alternative, the application may be configured to capture biometric data, such as a user's fingerprint, iris or facial features. The biometric data would then be sent to the CMC server 26 together with the personal mobile device identifier 518 and the door identifier so that all three can be used by the CMC server to make a decision as to whether to allow access to the user. The location of the personal mobile device may also be determined and sent to the CMC server 26 as a further factor in the authentication process. Location may be determined by GPS, assisted GPS, differential GPS, Wi-Fi trilateration, cell tower detection or any other means. The steps taken by the application 516 may be performed in a different order to that described.

The application(s) 516 may be configured to read a single type of token or multiple different types (e.g. both QR codes and NFC chips). The same application(s) 516 may be used for multiple doors, multiple buildings, multiple companies or even residential locations. In some cases, for example if the system is used to control access to club premises for which a subscription must be paid, a fee may be automatically charged to a user's account when he uses the application 516 to enter the club's premises.

The system may also include one or more components described in relation to other possible embodiments. In particular, the system may include a CMC that stores unified permissions for both physical access and access to logical assets. In this case, the granting of permission to a user to use a door or other physical asset will result in the granting of permission of that same user to one or more logical assets. In other words, permission for the physical assets and logical assets may be granted in a single step, if the physical and logical assets are already defined as a group to which a user is then given permission. The system may optionally include traditional door readers 30 (FIG. 3) as well as the door tokens 504, so that users can use the door for access either with a personal mobile device or a traditional RFID or other type of fob.

Figure 21:
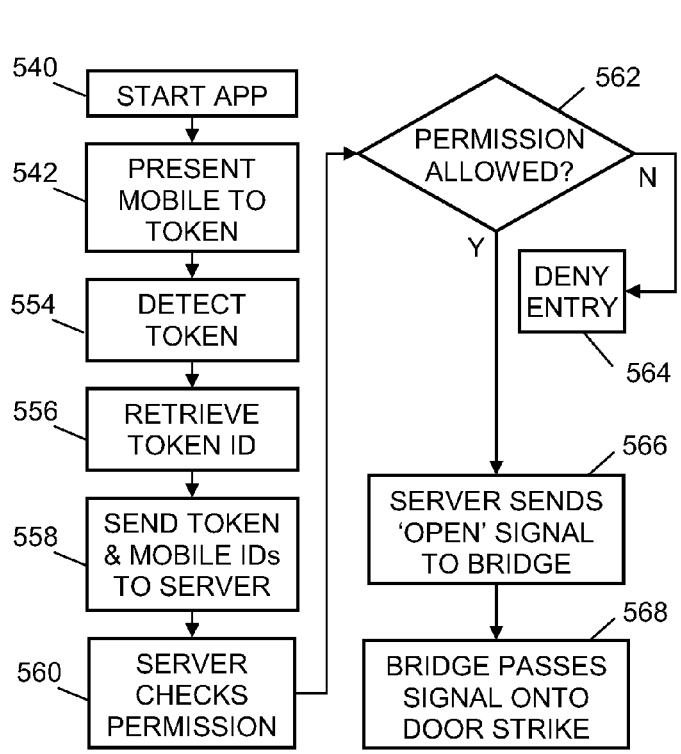
FIG. 21 is a flowchart of a process of the system using door tokens and personal mobile devices.

Referring to FIG. 21, we see a flowchart of a process carried out by the system when configured to use door tokens. In step 540, the application 516 is started. By this, it may be opened, from being closed, or it may simply be brought to the foreground after having been opened previously. In step 542, the personal mobile device 510 is then brought close to or in contact with the door token 504. At this point, in step 554, the personal mobile device detects the presence of the token, for example either by detecting that an NFC chip is present nearby or by detecting that there is an image in the field of view of the camera. In step 556 the personal mobile device retrieves the identification information embodied in the token, for example by taking a photo of a QR code and extracting the information in it, or by extracting the identification code stored in an NFC chip. In step 558, the personal mobile device 510 sends the door token ID and an identifier of the personal mobile device to the CMC server 26. The CMC server 26 then checks whether the user corresponding to the identifier for the personal mobile device has permission to enter the respective door. If, in step 562, permission not be granted, then the process ends at step 564, in which entry through the door is denied. A signal to that effect may be transmitted by the CMC 26 to the bridge 10 and on to an annunciator 30 (FIG. 3) that signals, for example by illuminating a red LED, that entry has been refused. If, in step 562, permission be granted, then the CMC server 26 sends an open door signal to the bridge, in step 566, which, in turn, passes the signal onto the door strike 32, causing the door to unlock.

Alternately, or additionally, communications may be sent from the server to the user's personal mobile device 510 to indicate to the user whether access is granted or denied. Indication to the user may be visual, textual or audible, or any combination of these.

Figure 22:
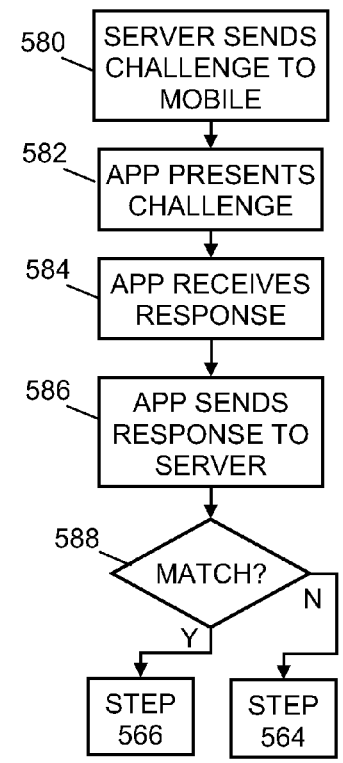
FIG. 22 is a flowchart of an additional process that may be carried out by the door token system.

In FIG. 22 a flowchart is shown of optional steps that may be taken by the system when configured with door tokens. These steps may be performed, for example, after step 562 and before step 566. In step 580, the server, upon determining that the user has been granted permission to open the door, sends a challenge to the personal mobile device. This may be a request to provide biometric data or to enter a password, part of a password, a PIN code, part of a PIN code, a response to a predetermined question to which the user has previously provided answers, a response to a picture displayed on the mobile device, or any other challenge. In step 582, the application presents the challenge to the user, receives the response to the challenge in step 584, and transmits the response to the CMC 26 in step 586. The CMC 26, in step 588, determines whether there be a match between the transmitted response and the expected response as stored or calculated at the CMC. If there not be a match, the process reverts to step 564, in which entry through the door is denied. However, if there be a match in step 588, the process reverts to step 566, in which an open signal is sent to the bridge 10.

Single-Use Digital Tokens

A further embodiment includes the facility to allow one-time access to a door. This may be useful for visitors to an establishment or for temporary workers. In this embodiment, a digital token (i.e. an electronic, soft or virtual token as opposed to previously described tokens which have a macroscopic physical form such as a QR code or NFC chip) is sent to the user's personal mobile electronic device to be used for entry through a particular door. One advantage of such digital tokens is that the administrator of the system doesn't need to assign the visitors or temporary workers to access groups in order for them to access a door.

Figure 23:
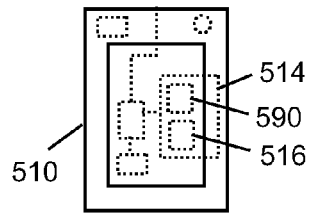
FIG. 23 is a personal mobile device with a single-use digital token.

Referring to FIG. 23, this embodiment includes the capability of sending a one-time digital token 590 to the user's personal mobile device 510, where it is stored in memory 514. The one-time digital token 590 may be sent to the device 510 from the CMC 26 or other server by email, SMS, push message or any other appropriate means. The application 516 may still be present, as the user may use it to access a normal place of business, or it may be needed to capture the door token 504 for the door 500 through which one-time entry is desired. In other embodiments, the application 516 may manage both a user's access to an everyday place of business as well as managing single use digital tokens 590 for entry into client businesses that the user may visit to make sales calls or maintenance calls, for example.

Figure 24:
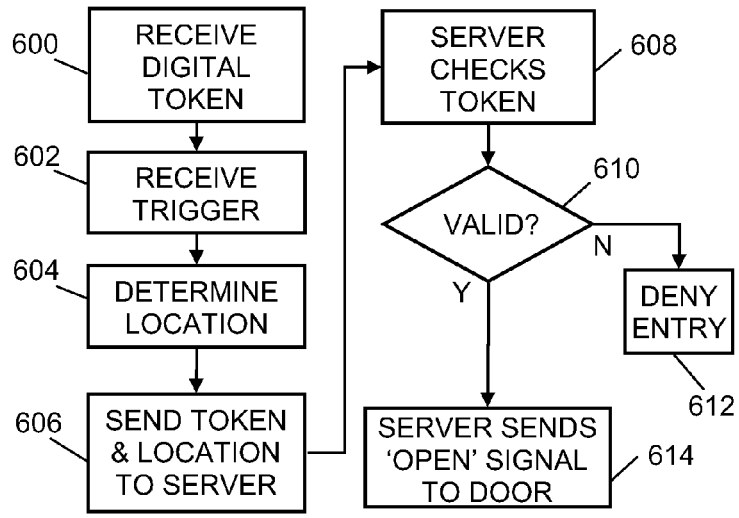
FIG. 24 is a flowchart of a door-opening process using the single-use digital token.

Referring to FIG. 24, a flowchart of a process is shown for the use of a one-time digital token 590. In step 600, the personal mobile device 510 receives a digital token, by email, sms or a push message, for example. The digital token 590 corresponds to a single door and may also correspond to a particular time, time interval or day. The digital token 590 may also contain information relating to a unique identifier of the user's personal mobile device 510. In step 602, the personal mobile device receives a trigger indicating that the user wants to enter through the door. The trigger may be the detection by the personal mobile device 510 of a door's QR code 504 or NFC code, for example. The trigger may be a click by the user on a link provided to the personal mobile device with the digital token 590. On receipt of the trigger, the personal mobile device 510 determines its own location, using GPS, for example. However, this may not be necessary if the door token 504 is captured, which will have the effect of determining the location of the user's mobile device. Upon receiving the trigger and determining the location of the user's mobile device 510, the mobile device sends the digital token 590 and location information to the CMC 26, in step 606. Next, in step 608, the CMC 26 checks the validity of the digital token 590, which may be a check in relation to one or more of the time of day, the location of the user's personal mobile device and the identity of the user's personal mobile device. If, in step 610, the digital token be found to be invalid, access is denied in step 612. If, however, the digital token 590 be valid, then in step 614 the CMC sends an open signal to the door, which may, but not necessarily, be via a bridge 10.

Another advantage of this embodiment is that a user can open the door without needing or using physical door tokens, such as a QR-code or NFC token.

The single-use digital token 590 may be used with additional security measures. For example, as well as the user being in the correct location, the user may be sent a challenge to which a correct response is required, as described in relation to FIG. 22. In this case the application 516 should be installed on the user's mobile device 510.

Figure 25:
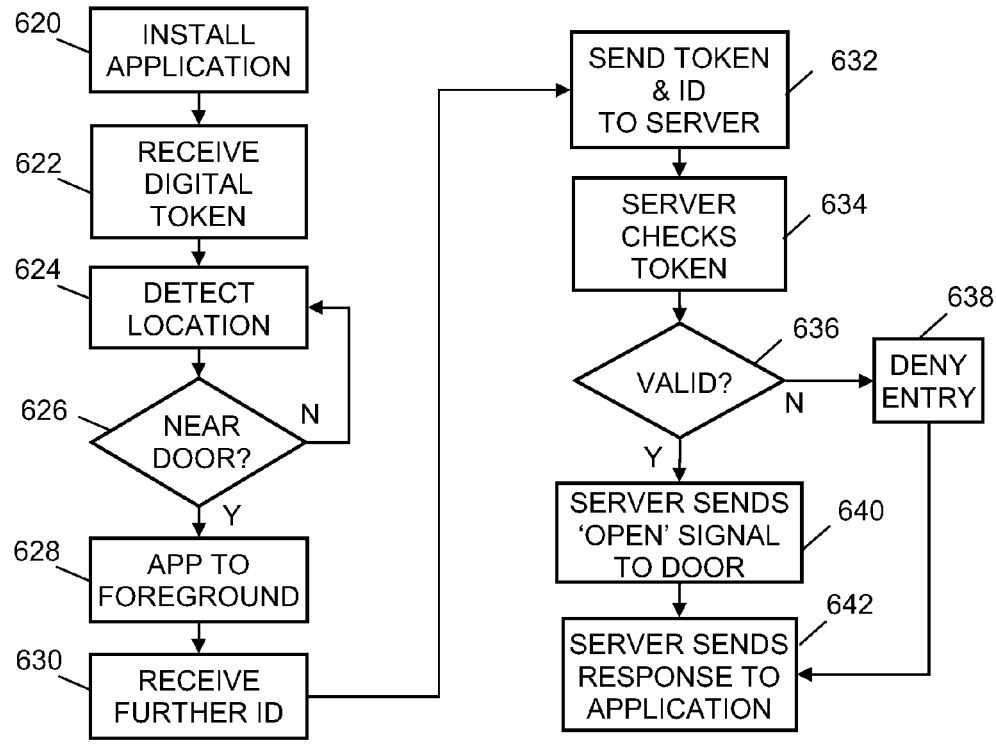
FIG. 25 is a flowchart of another door-opening process using the single-use digital token.

Referring to FIG. 25, in step 620, the application 516 is installed in the user's mobile device 510. In step 622, the user's mobile device receives the digital token. In step 624, the location of the user, or more accurately, the location of the user's mobile device 510 is detected. This may be by way of detecting a door token 504, but in other cases it may be by GPS, A-GPS or other location detection technology. If, in step 626, the user not be near the door, then the application 516 will revert to detecting the location of the user's mobile device 510 at a later time. However, if the user be near the door, then the application 516 is brought to the foreground in step 628 and the user is prompted to enter further identifying information in step 630. Then, in step 632, the user's mobile device sends the digital token 590 and further identification to the CMC 26. Such further identification may be a PIN or password. However, instead of the further identification, confirmation of identification resulting from a valid biometric input to the user's device may be sent to the CMC 26. Next, in step 634, the CMC 26 checks the validity of the digital token 590. If, in step 636, the digital token be found to be invalid, access is denied in step 638. If, however, the digital token 590 be valid, then in step 640 the CMC sends an open signal to the door, which may, but not necessarily, be via a bridge 10. Whether access is denied or allowed, a response message is sent to the user's mobile device in step 642, to indicate whether access is denied or allowed.

Another way of providing a challenge, without the user needing to install the application 516, would be to provide a link with the digital token 590, the link taking the user to a webpage where they are required to enter a PIN or other one-time password. Such a password may, for example, be the name of the person they are scheduled to visit or some other easily memorable word.

Mustering

Figure 26:
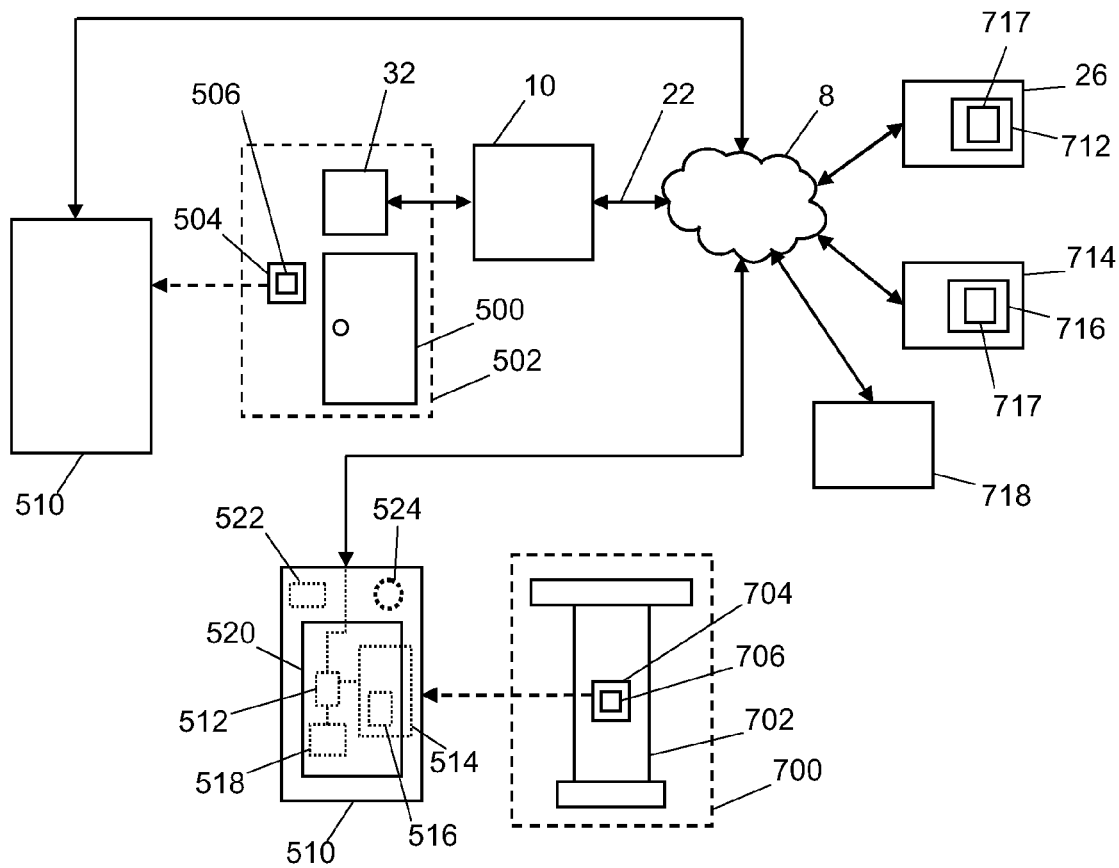
FIG. 26 is a mustering system with a mustering station and associated tag.

In a similar way to the use of unpowered door tokens, similar tokens can be used on mustering stations. An exemplary embodiment of a system incorporating unpowered mustering tokens is shown in FIG. 26. It includes a bridge 10 connected by communications link 22 to the network 8, and a CMC 26 also connected to the network. The network 8 may include the Internet, an Ethernet, a telecommunications network or a combination of these. Connected to the bridge 10 is a door strike 32 that is used to lock and unlock door 500. The associated components 502 of the door 500 include a unique identifying door token 504 placed in proximity to the door. The token 504 contains a unique identifier 506 that identifies the door. A personal mobile device 510 that is carried by a user wishing to enter through the door 500 is shown in the vicinity of the door token 504. Doors may be entered using cards and card readers as described above. Doors may be used without bridges 10 as in traditional physical access systems.

A mustering area 700 is also shown, which includes a mustering station 702 to which is firmly fixed a mustering token 704 containing an identifier 706 of the mustering station. The mustering area 700 is located at a safe distance from the building that is accessed by the door 500, while being reasonably quickly accessible by the building's occupants in case of an emergency. The CMC 26 includes a mustering module 712 which continually keeps track of the persons in the building accessed by the door 500, or is able to retrieve a list of such persons upon the occurrence of an emergency. The module 712 may be a software module located in memory in the CMC 26 and processed by a processor in the CMC.

The system may include more than one mustering area, each being tagged and identified with its own mustering token. Each mustering area 700 may include several mustering stations 702 to allow multiple users to check in at the same time. Likewise, each mustering station 702 may be tagged with multiple copies of the mustering token 704.

In addition to the CMC 26, which may be on site or offsite, an offsite backup server 714 may optionally be included, which may have a synchronizable copy 716 of the mustering module 712. At least one of the CMC 26 and the server 714 should be offsite and the invention will be described mainly in relation to the offsite server 714. In some embodiments the mustering module 716 may be made accessible to emergency services upon the occurrence of an emergency in order for them to directly obtain a list 717 of missing persons.

The system may also include one or more sensors 718 for detecting a possible emergency and triggering an alarm. Such sensors may be smoke detectors, fire alarm buttons, etc.

The personal mobile device 510 carried by a user wishing to muster is shown in the vicinity of the mustering token 704. The personal mobile device 510 includes one or more processors 512, memory 514, one or more applications 516 stored in the memory, a unique identification 518, and user interface 520, which may be a multi-touch screen, for example. Also included is an NFC reader 522 and/or a camera 524.

The camera 524, for example, may be used to take a snapshot of mustering token 704, if the mustering token is a QR code. The application(s) 516 may interpret the mustering code contained in the QR code and transmit the mustering code and the unique identification 518 of the personal mobile device via the network 8 to server 714. The unique identification of the personal mobile device 510 may be a MAC address, for example, stored in firmware or hardware memory, it may be derived from the MAC address, or it may be assigned to the personal mobile device by the CMC 26 or server 714 and stored in the memory 514.

When the mustering token 704 is scanned by the personal mobile device 510 and sent to the server 714, the mustering module 716 records the fact that the owner of the personal mobile device has mustered, provided that the mustering module has previously been provided with the personal mobile device identification and details of its owner.

The application(s) 516 may be configured in many different ways. They may transmit the QR code to the server 714 for interpretation there. They may be configured to automatically detect the presence of a QR code in the field of view of the camera 524, subsequently take a photo of it and then automatically send it and an identification of the personal mobile device to the server 714. Alternately, the application(s) 516 may be configured such that a user must enter a PIN code or a password in the mobile device before the application opens and is able to capture an image or reading of the mustering token 704. As a further alternative, the application may be configured to capture biometric data, such as a user's fingerprint, iris or facial features. The biometric data would then be sent to the server 714 together with the personal mobile device identification 518 and the mustering token identifier 704 so that all three can be used by the server to verify the identity and location of user. The location of the personal mobile device may also be determined by other means and sent to the server 714 as a further factor in the authentication process. Location may be determined by GPS, assisted GPS, differential GPS, Wi-Fi trilateration, cell tower detection or any other appropriate means. The steps taken by the application 516 may of course be performed in a different order to that described.

The application(s) 516 may be configured to read a single type of token or multiple different types (e.g. both QR codes and NFC chips). The same application(s) 516 may be used for entry though doors, multiple buildings, multiple companies or even residential locations.

The system may also include one or more components described in relation to other possible embodiments. In particular, the system may include a CMC 26 that stores unified permissions for both physical access and access to logical assets. In this case, the granting of permission to a user to use a door or other physical asset will result in the granting of permission of that same user to one or more logical assets. In other words, permission for the physical assets and logical assets may be granted in a single step, if the physical and logical assets are already defined as a group to which a user is then given permission.

The mustering system may accommodate both regular occupants of a building, for example those using traditional card readers for entry, and visitors using digital tokens. In this case, visitors may be allocated an expected duration of time of their visit or they may be asked to scan a QR code on their way out of the building. Other ways of estimating or confirming a visitor's length of stay may be used. This will allow the mustering module 716 to better keep track of whether visitors are inside or outside of a building.

Figure 27:
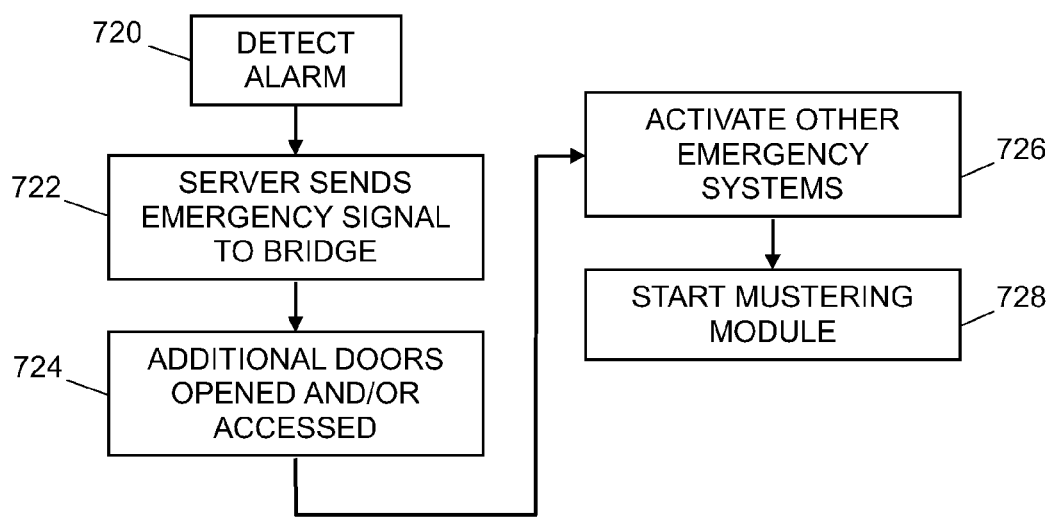
FIG. 27 is a flowchart of a process for initiating mustering.

Referring to FIG. 27 a flowchart is shown of a process for initiating mustering. In step 720 an alarm is detected. This could be automatic, via a sensor 718, or manually as a result of a person noticing an emergency and informing the CMC 26, which would then inform the server 714. Alternately, the person could inform the server 714 directly. In an emergency, the system then sends, in step 722, signals to the bridges 10 in order to unlock doors to allow emergency service access. Systems or doors without bridges can have their doors unlocked by the CMC 26 sending appropriate control signals to them via traditional panels, in step 724. In step 726, the CMC 26 activates other emergency systems, such as water sprinklers, equipment shut-down, etc. In step 728, the mustering module 716 is activated.

Figure 28:
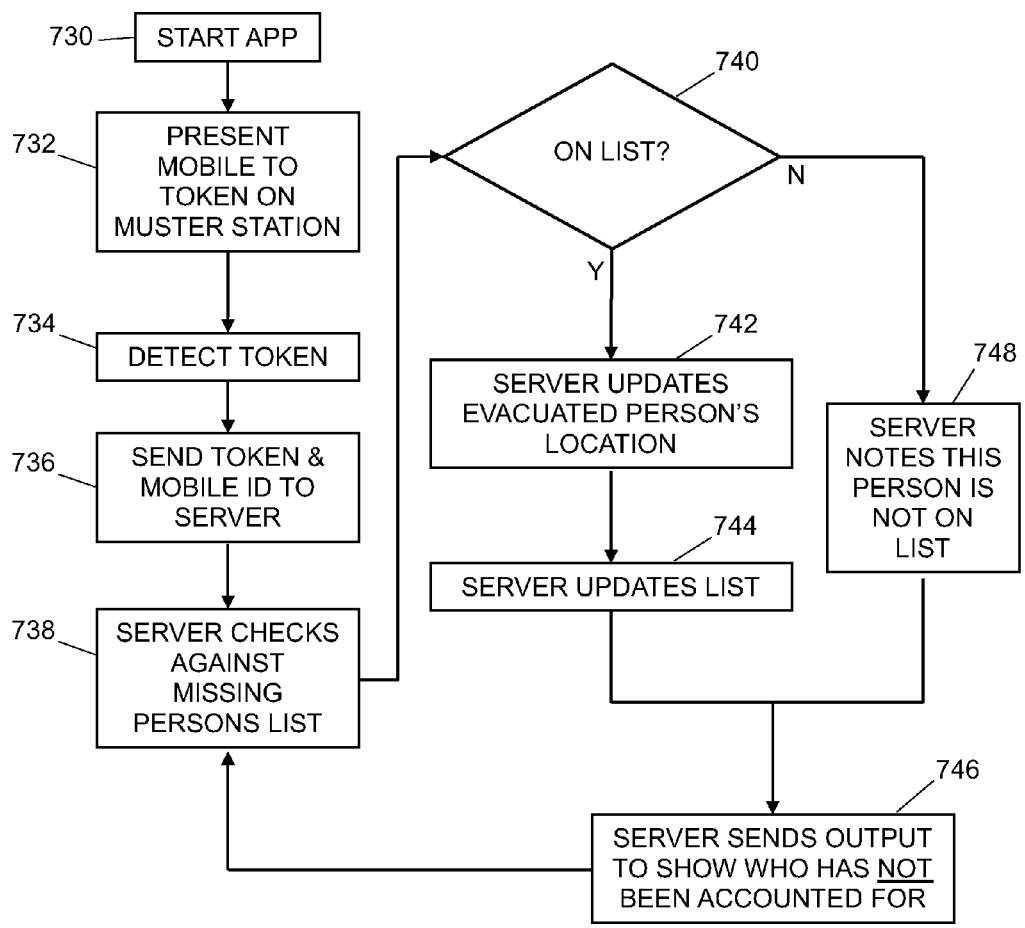
FIG. 28 is a flowchart of a process to update a missing persons list.

FIG. 28 is a flowchart of a process undertaken in the mustering module 716 in server 714 to update a missing persons list. In step 730, a user opens the application 516 on his personal mobile device 510. In step 732, he presents his personal mobile device to the mustering token 704 on the mustering station 702. In step 734, the personal mobile device detects the mustering token 704 and in step 736 sends the identifier 706 in the mustering token and the identification 518 of the personal mobile device 510 to the server 714. In step 738 the server 714 checks the identity of the user against the missing persons list 717. If, in step 740, the user be on the missing persons list 717, the server updates a record of the user's location in step 742. The user's location may be recorded as being at a particular mustering station, for example. In step 744, the server then updates the missing persons list by removing the user from the list. If, in step 740, the user not be on the list, then the server in step 748 makes a record that the user was not on the list but is now located at a particular mustering station. This would allow the system to account for employees arriving on site during an emergency, for example. In step 746, the server then sends an updated list to a personal mobile device carried by a mustering administrator, or to one or more of the emergency services that are involved with the safety and rescue of building occupants.

Figure 29:
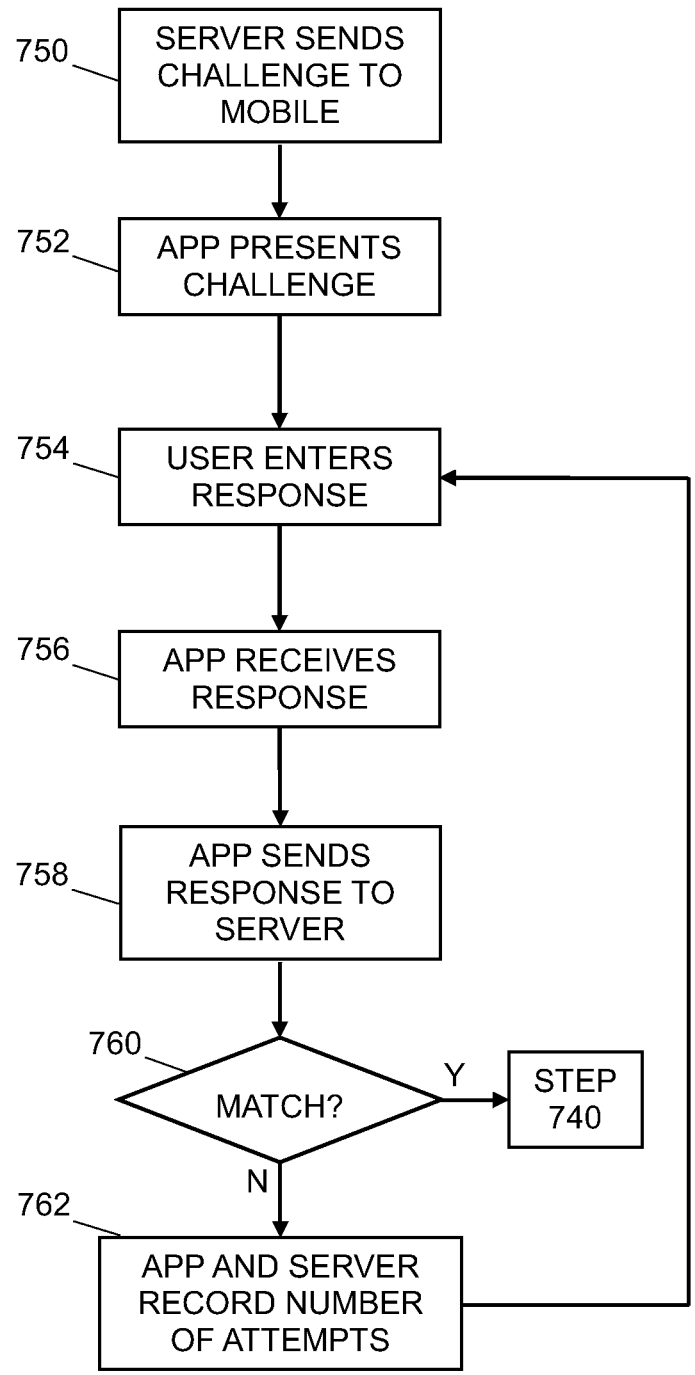
FIG. 29 is a flowchart of a process for a more secure check-in at a mustering station.

FIG. 29 is a flowchart of a process for a more secure check in at a mustering station. After a user has captured a mustering token at a mustering station and sent it to the server 714, the server sends a challenge back to the user, in step 750. In step 752, the application 516 on the personal mobile device then presents the challenge to the user. The challenge may be a request for a PIN, a password, a part of a password, biometric input, etc. In step 754, the user enters a response to the challenge on his personal mobile device. In step 756, the application accepts the response and in step 758 it sends it to the server. The server, in step 760, determines whether there be a match between the challenge and the response. If there be a match, the system reverts to step 740 of FIG. 28, where the server checks whether the person be on the missing persons list. If there not be a match, then in step 762, the application and/or the server record the number of attempts at entering a valid response and the process reverts to step 754, or alternately, step 752.

Figure 30:
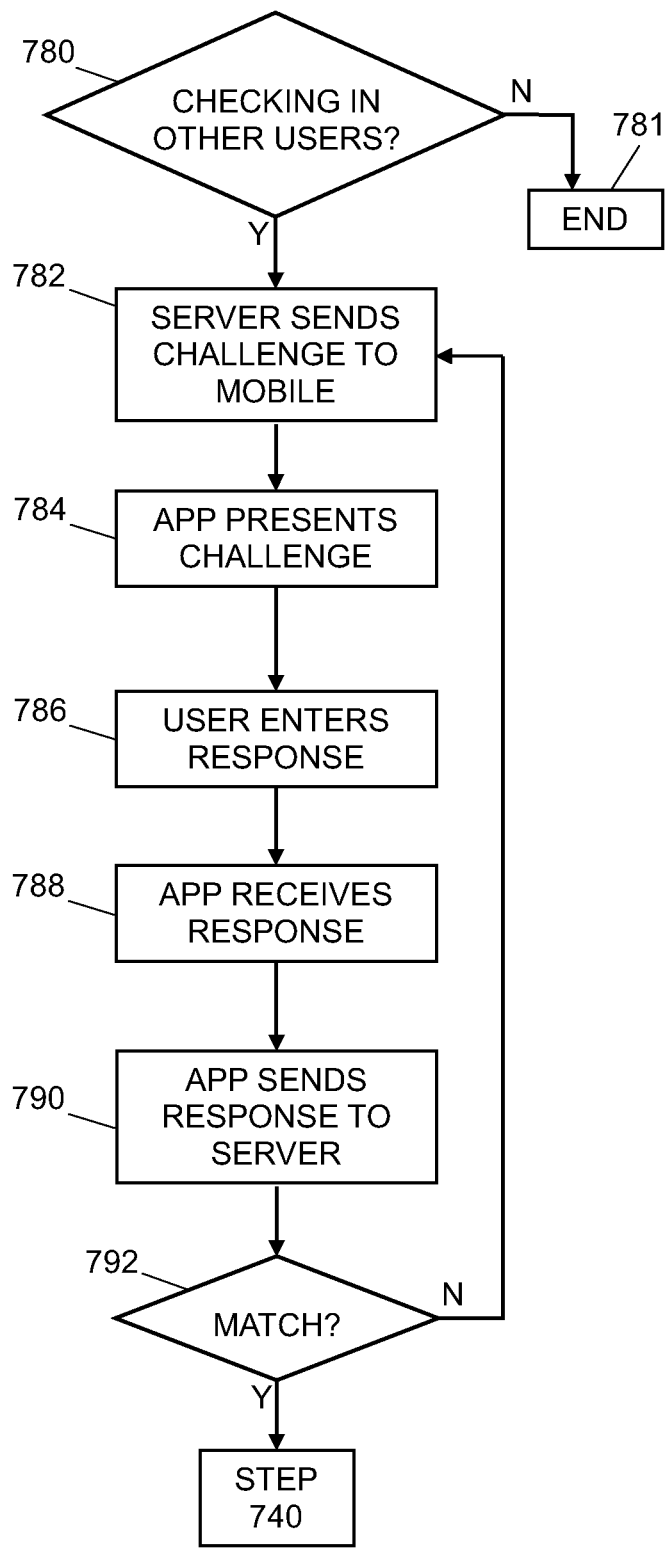
FIG. 30 is a flowchart of a process for checking in other persons.

FIG. 30 is a flowchart of a process for checking in other users. In step 780 the application 516 presents an option to the user of the personal mobile device as to whether he wants to check in other users who may not have their own personal mobile devices to hand, or whose devices are not charged. If there be no other users to check in, the process ends at step 781. If there be another user to check in, the server in step 782 sends a challenge relating to the other user to the personal mobile device. The owner of the personal mobile device then gives it to the other user if he has not already done so. In step 784, the application 516 on the personal mobile device then presents the challenge to the other user. As before, the challenge may be a request for a PIN, a password, a part of a password, biometric input, etc. In step 786, the other user enters a response to the challenge on the personal mobile device. In step 788, the application accepts the response and in step 790 sends it to the server. The server, in step 792, determines whether there be a match between the challenge and the response. If there be a match, the system reverts to step 740 of FIG. 28. If there not be a match, the process reverts to step 782, or alternately, step 784 or step 786.

Figure 31:
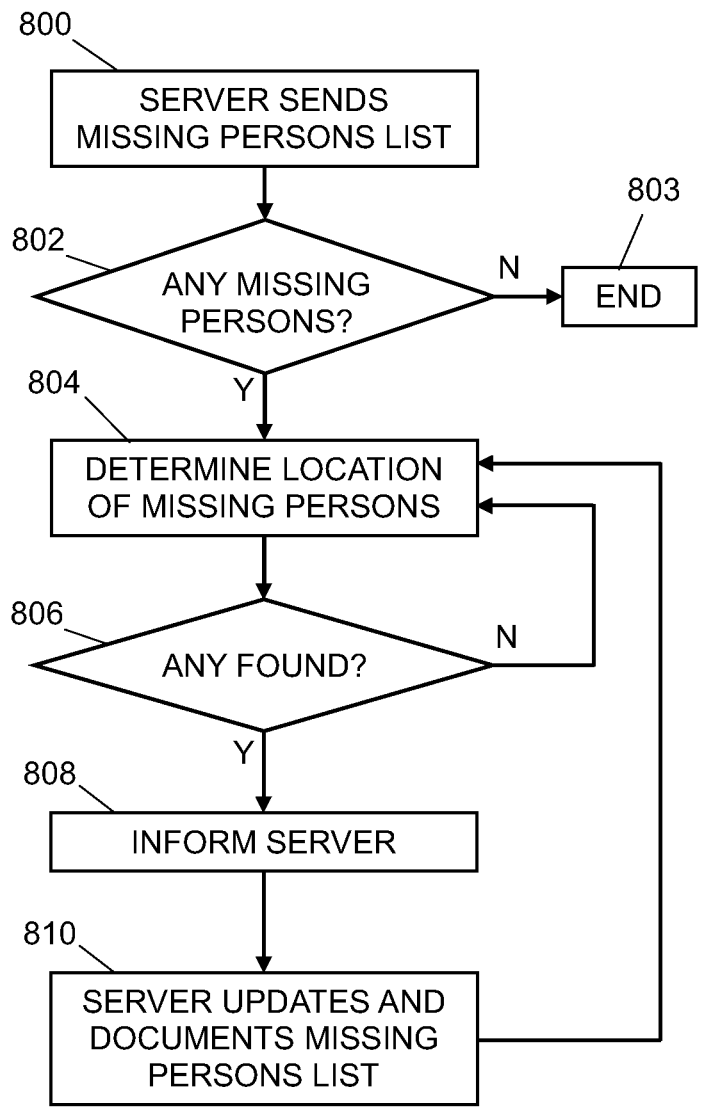
FIG. 31 is a flowchart of a process for accounting for persons that have not checked in and that are found.

FIG. 31 is a flowchart of a process for accounting for persons that have not checked in and that are later found, In step 800 the server 714 sends a list of missing persons to a mustering administrator, an emergency worker, or both. If, in step 802, there be no persons missing, in which case the list will be empty, the process ends at step 803. If, however, in step 802, there be one or more missing persons, the process proceeds to step 804, in which rescue workers, mustering administrators or evacuees attempt to locate the missing persons. If any of the missing persons be found, in step 806, a mustering administrator or other user uses a personal mobile device to inform the server 714 that such persons are found. These persons may be injured and therefore not able to use a personal mobile device to identify themselves or to check-in at a muster station. In step 810, the server updates the list of missing persons by removing the persons that are found from the list.

There are many possible variations of the mustering system based on changing the order of steps in the processes described or by varying the components of the system. The main requirement is that an unpowered token at a mustering station be detected by a personal mobile device, which can communicate with a server that manages a list of persons to be mustered.

Further Variations

There are a number of ways to trigger the door activation from the user's mobile device. The trigger could be a voice command, in combination with location. The user may start up the application 516 on the phone and just say, for example, "open back door" or "unlock front door". Provided the user's location is verified and access is allowed, the door will be opened or unlocked. If the user's mobile device has a location service installed it can start the application 516 automatically when the user reaches a certain location coordinate and the user would just push an on-screen button displayed on the device to unlock the door. The point is that the actual triggering of the access request can be any kind of action or combination of actions, including one or more of a QR-scan, an NFC scan, entry of a PIN, a clicked link, a gesture, a fingerprint, the pushing of a soft button, a voice command, voice recognition, face recognition, location detection, etc.

In security access systems where key fobs or cards are used, an advantage of the use of digital tokens is that the administrator of the system doesn't need to assign the visitors or temporary workers a fob or physical card.

Single-use digital tokens may alternately be valid for multiple doors, multiple entries through the same door, or both.

In an alternate embodiment, both a QR code and an NFC chip may be used to identify the same door.

Besides doors and other portals, access to any physical device may be controlled with this system, such as machinery, lab equipment, vehicles, safes, industrial control systems, printers, photocopiers etc. For example, a vehicle may display a QR code on its door or dashboard, and the ignition of the vehicle may be made accessible depending on whether the user, who has retrieved the token identifying the vehicle and sent it to the CMC server 26, is an approved user or not.

INDUSTRIAL APPLICABILITY

The invention is useful for accessing, controlling and managing multiple different types of physical devices via the Internet, including physical security devices. The system may also manage traditional logical assets, thereby merging the physical and logical password security management functions into a unified permissions management system. Existing physical devices may be interfaced to the system by electronic bridges that convert traditional protocols into an Internet Protocol.

As will be apparent to those skilled in the art, and in light of the foregoing disclosure, many further alterations and modifications are possible in the practice of this invention without departing from the scope thereof. The steps of the process described herein may be performed in a different order to that shown, they may be performed differently, or some may be omitted while still achieving the same objective. Steps from one flowchart may be combined with steps from another flowchart. Accordingly, the scope of the invention is to be construed in accordance with the substance defined by the following claims:

The invention claimed is:

1. A mustering station comprising:
   a structure located apart from a building from which persons are to be mustered in case of emergency; and
   an unpowered token attached to the structure, said token comprising an identifier of the mustering station,
   wherein said identifier is detectable by a personal mobile electronic device of a user and is able to be transmitted by the personal mobile electronic device to a remote server; and
   wherein said identifier is part of a system that comprises:
      a door strike that unlocks a door to a building from which the persons are to be mustered; and
      an electronic bridge connected to the door strike and configured to receive control instructions and pass the control instructions to the door strike; and
      the remote server, which is configured to:
         receive a request from the user to operate the door strike;

retrieve a permission level for the user to access said door strike;

when the permission level indicates that permission is granted, generate a TCP/IP packet comprising an access granted control instruction and send the packet to the electronic bridge, upon which said electronic bridge passes the access granted control instruction to said door strike causing it to operate;

upon operation of the door strike, add the user to a list of persons to be mustered;

receive, from the personal mobile electronic device when located in the vicinity of the mustering station, the identifier and an identification of the personal mobile electronic device;

check whether the identification is valid; and when the identification is valid, remove the user from the list.

2. The mustering station of claim 1, wherein the token is a quick response code.

3. The mustering station of claim 1, wherein the token is a near field communication chip.

4. A mustering system comprising:
a mustering station;
an unpowered token comprising an identifier for, and attached to, the mustering station;
a server remote from the mustering station and configured to store a list of persons to be mustered;
a door strike that unlocks a door to a building from which the persons are to be mustered; and
an electronic bridge connected to the door strike and configured to receive control instructions and pass the control instructions to the door strike;
wherein the server is configured to:
  receive a request from a user to operate the door strike;
  retrieve a permission level for the user to operate said door strike;
  when the permission level indicates that permission is granted, generate a TCP/IP packet comprising an access granted control instruction and send the packet to the electronic bridge, upon which said electronic bridge passes the access granted control instruction to said door strike causing it to operate;
  upon operation of the door strike, add the user to the list;
  receive, from a personal mobile electronic device of the user located in the vicinity of the mustering station, the identifier and an identification of the personal mobile electronic device;
  check whether the identification is valid; and
  when the identification is valid, remove the user from the list.

5. The system of claim 4, wherein the token is a quick response code.

6. The system of claim 4, wherein the token is a near field communication chip.

7. The system of claim 4, wherein the server is further configured to:
send a challenge to the personal mobile electronic device;
receive a response from the personal mobile electronic device;
determine whether the response is a correct response; and
remove the user from the list conditionally upon the response being a correct response.

8. The system of claim 4, wherein the server is further configured to:
receive biometric data from the user of the personal mobile electronic device, said biometric data having been obtained by the personal mobile electronic device;
determine whether the biometric data corresponds to previous biometric data stored and related to the user in a database; and
remove the user from the list conditionally upon the biometric data corresponding to the previous biometric data.

9. The system of claim 4, wherein the server is further configured to:
send a further challenge to the personal mobile electronic device for a further user;
receive a response from the personal mobile electronic device;
determine whether the response is a correct response; and
remove the further user from the list conditionally upon the response being a correct response.

10. The system of claim 4, wherein the server is further configured to:
receive biometric data from a further user of the personal mobile electronic device, said biometric data having been obtained by the personal mobile electronic device;
determine whether the biometric data corresponds to previous biometric data stored and related to the further user in a database; and
remove the further user from the list conditionally upon the biometric data corresponding to the previous biometric data.

11. The system of claim 4, wherein the permission level is also for the user to access one or more logical assets.

12. The system of claim 4, further comprising
an unpowered token comprising an identifier for, and located in the vicinity of, the door strike;
wherein the server is configured to:
  receive, from a further personal mobile electronic device located in the vicinity of the door strike, the identifier of said door strike and an identification of the further personal mobile electronic device;
  retrieve a permission level for a further user associated with the identification of the further personal mobile device to operate the door strike; and
  when the permission level indicates that permission for the further user is granted, generate a TCP/IP packet comprising an access granted control instruction and send the packet to the electronic bridge, upon which said electronic bridge passes the access granted control instruction to said door strike causing it to operate.

13. The system of claim 12, wherein
upon operation of the door strike the server adds the further user to the list.

14. The system of claim 4, wherein the server is configured to send the list of persons to be mustered to another electronic device.

15. A method for mustering, comprising:
receiving, by a server, a request from a user to operate a door strike that unlocks a door to a building from which persons are to be mustered;
retrieving, by the server, a permission level for the user to operate said door strike;
when the permission level indicates that permission is granted, generating a TCP/IP packet comprising an access granted control instruction and sending the packet to an electronic bridge connected to the door strike, upon which the electronic bridge passes the access granted control instruction to the door strike causing it to operate;
upon operation of the door strike, adding, by the server, the user to a list of persons to be mustered;

receiving, by the server, from a personal mobile electronic device of the user located in the vicinity of a mustering station, an identifier of the mustering station and an identification of the personal mobile electronic device, said identifier having been retrieved from an unpowered token attached to the mustering station;

checking, by the server, whether the identification is valid; and when the identification is valid, removing the user from said list.

16. The method of claim 15, wherein the token is a quick response code or a near field communication chip.

17. The method of claim 15, further comprising:

sending a challenge from the server to the personal mobile electronic device;

receiving, by the server, a response from the personal mobile electronic device;

determining, by the server, whether the response is a valid response; and removing the user from the list conditionally upon the response being a valid response.

18. One or more non-transitory computer readable media comprising computer readable instructions that, when executed by one or more processors cause a server to:

receive a request from a user to operate a door strike that unlocks a door to a building from which persons are to be mustered;

retrieve a permission level for the user to operate said door strike;

when the permission level indicates that permission is granted, generate a TCP/IP packet comprising an access granted control instruction and send the packet to an electronic bridge connected to the door strike, upon which the electronic bridge passes the access granted control instruction to the door strike causing it to operate;

upon operation of the door strike, add the user to a list of persons to be mustered;

receive, from a personal mobile electronic device of the user located in the vicinity of a mustering station, an identifier of the mustering station and an identification of the personal mobile electronic device;

check whether the identification is valid; and when the identification is valid, remove the user from the list.

\* \* \* \* \*